United States Patent
Motooka et al.

(10) Patent No.: US 10,017,697 B2
(45) Date of Patent: *Jul. 10, 2018

(54) THERMOSETTING COMPOSITION WITH PHOTO-ALIGNMENT PROPERTY, ALIGNMENT LAYER, SUBSTRATE WITH ALIGNMENT LAYER, RETARDATION PLATE, AND DEVICE

(71) Applicant: DAI NIPPON PRINTING CO., LTD., Tokyo-to (JP)

(72) Inventors: Mami Motooka, Tokyo-to (JP); Ken-ichi Okuyama, Tokyo-to (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/118,049

(22) PCT Filed: Feb. 4, 2015

(86) PCT No.: PCT/JP2015/053142
§ 371 (c)(1),
(2) Date: Aug. 10, 2016

(87) PCT Pub. No.: WO2015/122335
PCT Pub. Date: Aug. 20, 2015

(65) Prior Publication Data
US 2016/0355736 A1 Dec. 8, 2016

(30) Foreign Application Priority Data
Nov. 18, 2014 (JP) .................... 2014-233518

(51) Int. Cl.
*C09K 19/56* (2006.01)
*C08F 12/22* (2006.01)
(Continued)

(52) U.S. Cl.
CPC .............. *C09K 19/56* (2013.01); *C08F 12/22* (2013.01); *C08F 12/24* (2013.01); *C08F 12/26* (2013.01);
(Continued)

(58) Field of Classification Search
CPC ............... C09K 19/56; C02F 1/133711; C02F 1/133788; C02F 1/13378; C08F 12/04;
(Continued)

(56) References Cited

U.S. PATENT DOCUMENTS

2003/0087045 A1  5/2003  Nakata et al.
2012/0082805 A1  4/2012  Hatanaka et al.
(Continued)

FOREIGN PATENT DOCUMENTS

JP  4094764 B  6/2008
JP  4207430 B  1/2009
(Continued)

OTHER PUBLICATIONS

Fukuda, "Photoinduced Surface Relief Formation on Azobenzen Thin Film", Japanese Journal of Polymer Science and Technology, 2003, vol. 60, No. 8, pp. 428-441—partial translation.
(Continued)

*Primary Examiner* — Ruiyun Zhang
(74) *Attorney, Agent, or Firm* — Hamre, Schumann, Mueller & Larson, P.C.

(57) ABSTRACT

An embodiment of the present invention provides a thermosetting composition with a photo-alignment property, including a copolymer containing a photo-alignment constitutional unit represented by the following formula (1) and a thermal cross-linking constitutional unit. In the formula (1), X represents a photo-alignment group causing a photo-isomerization reaction or a photo-dimerization reaction, $L^1$
(Continued)

represents a single bond, —O—, —S—, —COO—, —COS—, —CO—, —OCO—, —OCO(CH$_2$)$_n$COO—, —OCOCH$_2$CH$_2$OCH$_2$CH$_2$COO—, —OCOC$_6$H$_4$O—, —OCOC$_6$H$_{10}$O—, —COO(CH$_2$)$_n$O—, —COOC$_6$H$_4$O—, —COOC$_6$H$_{10}$O—, —O(CH$_2$)$_n$O—, —OC$_6$H$_4$O—, —OC$_6$H$_{10}$O—, or —(CH$_2$)$_n$O—, n represents 1 to 4, R$^1$ represents a hydrogen atom or a monovalent organic group, and k represents 1 to 5.

[Chemical Formula 1]

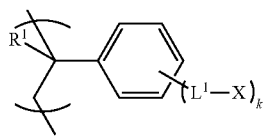

(1)

14 Claims, 1 Drawing Sheet

(51) Int. Cl.
C08F 12/24 (2006.01)
C08F 12/26 (2006.01)
C08F 12/32 (2006.01)
C08F 12/34 (2006.01)
C08F 212/14 (2006.01)
G02B 5/30 (2006.01)
C08F 220/18 (2006.01)
C08F 220/28 (2006.01)
C08F 220/68 (2006.01)
G02F 1/1337 (2006.01)
G02F 1/13363 (2006.01)
C08F 220/20 (2006.01)
C08F 220/58 (2006.01)
C08F 220/32 (2006.01)

(52) U.S. Cl.
CPC .............. C08F 12/32 (2013.01); C08F 12/34 (2013.01); C08F 212/14 (2013.01); C08F 212/145 (2013.01); C08F 220/18 (2013.01); C08F 220/28 (2013.01); C08F 220/68 (2013.01); G02B 5/30 (2013.01); G02B 5/3083 (2013.01); G02F 1/133711 (2013.01); C08F 220/20 (2013.01); C08F 220/58 (2013.01); C08F 2220/283 (2013.01); C08F 2220/325 (2013.01); G02F 1/13363 (2013.01); G02F 1/133788 (2013.01)

(58) Field of Classification Search
CPC ........ C08F 12/08; C08F 12/34; C08F 212/14; C08F 212/34; C08F 220/30; G02B 5/30; G02B 5/308; Y10T 428/10; Y10T 428/1005; G02F 1/133711; G02F 1/133788; G02F 1/13378
USPC .......... 428/1.1, 1.2; 349/127, 130, 132, 134, 349/135
See application file for complete search history.

(56) References Cited

U.S. PATENT DOCUMENTS

2012/0114879 A1    5/2012  Hatanaka et al.
2013/0029087 A1    1/2013  Hatanaka et al.
2015/0253631 A1*   9/2015  Hatanaka ............... G02B 5/201
                                                       428/195.1
2016/0025915 A1    1/2016  Goto et al.

FOREIGN PATENT DOCUMENTS

JP    2011-248328         12/2011
JP    WO 2014042216 A1 *  3/2014  ............ G02B 5/201
WO    2010/150748         12/2010
WO    2011/010635         1/2011
WO    2011/126022         10/2011
WO    2014/104320         7/2014

OTHER PUBLICATIONS

Kim, et al., "Surface relief grating and liquid crystal alignment on azobenzene functionalized polymers", Optical Materials, 2003, vol. 21, issues 1-3, pp. 627-631.
Notice of Allowance issued in U.S. Appl. No. 15/118,039, dated Mar. 21, 2018, 9 pages.

* cited by examiner

THERMOSETTING COMPOSITION WITH PHOTO-ALIGNMENT PROPERTY, ALIGNMENT LAYER, SUBSTRATE WITH ALIGNMENT LAYER, RETARDATION PLATE, AND DEVICE

TECHNICAL FIELD

The present invention relates to a thermosetting composition with a photo-alignment property, which is used for an alignment layer.

BACKGROUND ART

With regard to a liquid crystal, diverse applications to various kinds of optical elements such as a retardation plate and a polarizing plate except a liquid crystal display element have been studied by utilizing an alignment property and anisotropy of physical properties such as refractive index, dielectric constant and magnetic susceptibility.

An alignment layer is used for aligning a liquid crystal. A rubbing method and a photo-alignment method are known as examples of a formation method for an alignment layer, and the photo-alignment method is useful in view of being capable of controlling quantitative alignment treatment by reason of no occurrence of static electricity and dust as a problem of the rubbing method (refer to Patent Document 1, for example).

Thermal stability and solvent resistance except liquid crystal alignment ability are required for an alignment layer. For example, the alignment layer is occasionally exposed to heat and solvents in the production process of various kinds of devices, and to high temperature during the use of various kinds of devices. The exposure of the alignment layer to high temperature brings a possibility of remarkably deteriorating liquid crystal alignment ability.

Then, for example, in Patent Document 2, in order to obtain stable liquid crystal alignment ability, a liquid crystal alignment agent containing a polymer component having a structure capable of a cross-inking reaction by light and a structure which cross-links by heat, and a liquid crystal alignment agent containing a polymer component having a structure capable of a cross-inking reaction by light and a compound having a structure which cross-links by heat are proposed.

Also, in Patent Document 3, in order to obtain excellent liquid crystal alignment ability, sufficient thermal stability, high solvent resistance and high transparency, a thermosetting film forming composition having a photo-alignment property, containing (A) an acrylic copolymer having a photo-dimerization site and a thermal cross-linking site and (B) a cross-linking agent, is proposed. (B) The cross-linking agent bonds to a thermal cross-linking site of (A) the acrylic copolymer, and the thermosetting film forming composition having a photo-alignment property is cured by heating to form a cured film, and then an alignment layer may be formed by irradiating the cured film with polarized ultraviolet rays.

In Patent Document 4, in order to obtain excellent liquid crystal alignment ability, sufficient thermal stability, high solvent resistance and high transparency, a thermosetting film forming composition having a photo-alignment property, containing (A) an acrylic copolymer having a photo-dimerization site and a thermal cross-linking site, (B) an acrylic polymer having at least one of predetermined alkyl ester group and hydroxyalkyl ester group, and at least one of a carboxyl group and a phenolic hydroxy group, and (C) a cross-linking agent, is proposed. (C) The cross-linking agent bonds to a thermal cross-linking site of (A) the acrylic copolymer and to a carboxyl group and a phenolic hydroxy group of (B) the acrylic polymer, and the thermosetting film forming composition having a photo-alignment property is cured by heating to form a cured film, and then an alignment layer may be formed by irradiating the cured film with polarized ultraviolet rays.

In Patent Document 5, in order to obtain excellent liquid crystal alignment ability, sufficient thermal stability, high solvent resistance and high transparency, a thermosetting film forming composition having a photo-alignment property, containing (A) a compound having a photo-alignment group and a hydroxy group, (B) a polymer having at least one of a hydroxy group and a carboxyl group, and (C) a cross-linking agent, is proposed. (C) The cross-linking agent bonds to a hydroxy group of (A) the compound and to a hydroxy group and a carboxyl group of (B) the polymer, and the thermosetting film forming composition having a photo-alignment property is cured by heating to form a cured film, and then an alignment layer may be formed by irradiating the cured film with polarized ultraviolet rays.

CITATION LIST

Patent Documents

Patent Document 1: Japanese Patent (JP-B) No. 4094764
Patent Document 2: JP-B 4207430
Patent Document 3: WO 2010/150748
Patent Document 4: WO 2011/010635
Patent Document 5: WO 2011/126022
Patent Document 6: WO 2014/104320

SUMMARY

In these manners, thermal curing is proposed for improving thermal stability and solvent resistance of an alignment layer. However, thermal curing may cause decrease in photoreactivity in some cases. In particular, as Patent Documents 3 and 4, when the acrylic copolymer includes both a photo-dimerization site and a thermal cross-linking site, it is considered that the dimerization is hardly caused since the photo-dimerization sites of side chains of the acrylic copolymer in the cured film are separated from each other.

The irradiation dose of polarized ultraviolet rays may be increased and the irradiation time may be increased for improving alignment restraining force, but throughput decreases in that case. Accordingly, improvement of the sensitivity of the material to be used for the alignment layer to light is demanded to decrease the irradiation dose of polarized ultraviolet rays and to decrease the irradiation time also from the view point of energy saving.

The present disclosure has been made in view of the problem, and an objective thereof is to provide a thermosetting composition with a high sensitive photo-alignment property in the thermosetting composition containing a copolymer including both a photo-alignment site and a thermal cross-linking site, and provide an alignment layer, a substrate with the alignment layer, a retardation plate and a device using the thermosetting composition.

An embodiment of the present invention provides a thermosetting composition having a photo-alignment property, comprising a copolymer containing a photo-alignment constitutional unit represented by the following formula (1) and a thermal cross-linking constitutional unit:

[Chemical Formula 1]

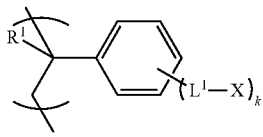

(in the formula (1), X represents a photo-alignment group causing a photo-isomerization reaction or a photo-dimerization reaction, $L^1$ represents a single bond, —O—, —S—, —COO—, —COS—, —CO—, —OCO—, —OCO(CH$_2$)$_n$COO—, —OCOCH$_2$CH$_2$OCH$_2$CH$_2$COO—, —OCOC$_6$H$_4$O—, —OCOC$_6$H$_{10}$O—, —COO(CH$_2$)$_n$O—, —COOC$_6$H$_4$O—, —COOC$_6$H$_{10}$O—, —O(CH$_2$)$_n$O—, —OC$_6$H$_4$O—, —OC$_6$H$_{10}$O—, or —(CH$_2$)$_n$O—, n represents 1 to 4, $R^1$ represents a hydrogen atom or a monovalent organic group, and k represents 1 to 5).

Further, an embodiment of the present invention provides an alignment layer comprising a copolymer including a photo-alignment constitutional unit represented by the formula (1) and a cross-linking structure, and the alignment layer comprising a photo-dimerization structure or a photo-isomerization structure of a photo-alignment group in the photo-alignment constitutional unit.

Also, an embodiment of the present invention provides a substrate with an alignment layer comprising a substrate, and an alignment layer disposed on the substrate and formed from the thermosetting composition with a photo-alignment property or the alignment layer described above.

Also, an embodiment of the present invention provides a retardation plate comprising the substrate with an alignment layer described above and a retardation layer disposed on the alignment layer of the substrate with the alignment layer.

In addition, an embodiment of the present invention provides a device comprising an alignment layer formed from the thermosetting composition with a photo-alignment property or the alignment layer described above.

DESCRIPTION OF EMBODIMENTS

Figure 1:
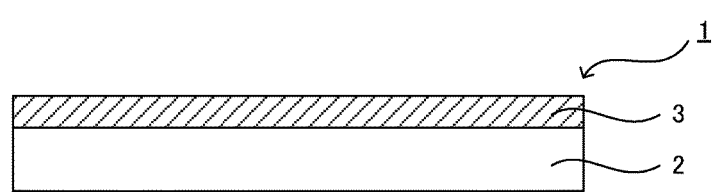
FIG. 1 is a schematic sectional view showing an example of a substrate with an alignment layer of an embodiment of the present invention.

A thermosetting composition with a photo-alignment property, and an alignment layer, a substrate with the alignment layer, a retardation plate and a device using the thermosetting composition of an embodiment of the present invention are hereinafter described in detail.

A. Thermosetting Composition with Photo-Alignment Property

A thermosetting composition with a photo-alignment property of an embodiment of the present invention comprises a copolymer containing a photo-alignment constitutional unit represented by the following formula (1) and a thermal cross-linking constitutional unit.

[Chemical Formula 2]

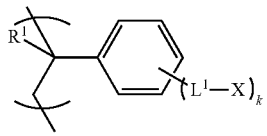

(In the formula (1), X represents a photo-alignment group causing a photo-isomerization reaction or a photo-dimerization reaction, $L^1$ represents a single bond, —O—, —S—, —COO—, —COS—, —CO—, —OCO—, —OCO(CH$_2$)$_n$COO—, —OCOCH$_2$CH$_2$OCH$_2$CH$_2$COO—, —OCOC$_6$H$_4$O—, —OCOC$_6$H$_{10}$O—, —COO(CH$_2$)$_n$O—, —COOC$_6$H$_4$O—, —COOC$_6$H$_{10}$O—, —O(CH$_2$)$_n$O—, —OC$_6$H$_4$O—, —OC$_6$H$_{10}$O—, or —(CH$_2$)$_n$O—, n represents 1 to 4, $R^1$ represents a hydrogen atom or a monovalent organic group, and k represents 1 to 5.)

In an embodiment of the present invention, the copolymer contains the photo-alignment constitutional unit represented by the formula (1) so that photo-dimerization reactivity or photo-isomerization reactivity may be enhanced to improve sensitivity. The reason therefor is not clear, but surmised as follows. That is to say, the photo-alignment constitutional unit includes a styrene skeleton so that a stacking structure is easily formed by an interaction of the n-electron systems of styrene skeletons of the photo-alignment constitutional unit. Also, in the photo-alignment constitutional unit represented by the formula (1), $L^1$ is a single bond or a divalent linking group with short chain length, and the photo-alignment group and the styrene skeleton are close. Thus, it is surmised that the photo-alignment group is in the positional relationship of easily causing a photo-isomerization reaction or a photo-dimerization reaction. For example, in the case of a photo-isomerization reaction, it is conceived that styrene skeletons of the photo-alignment constitutional unit are stacked and the photo-alignment group and the styrene skeleton are so close that the photo-alignment group is easily aligned to improve photo-isomerization reactivity. Also, in the case of a photo-dimerization reaction, it is conceived that styrene skeletons of the photo-alignment constitutional unit are stacked and the photo-alignment group and the styrene skeleton are so close that the distance between the photo-alignment groups is shortened to improve photo-dimerization reactivity.

Accordingly, in an embodiment of the present invention, a thermosetting composition with a high-sensitive photo-alignment property, capable of forming an alignment layer at small light exposure, may be obtained. Consequently, an embodiment of the present invention is useful in viewpoint of energy saving since their radiation dose of polarized ultraviolet rays during the formation of the alignment layer may be decreased to shorten the irradiation time.

Also, in an embodiment of the present invention, the copolymer contains the photo-alignment constitutional unit represented by the formula (1) so that an alignment layer with favorable liquid crystal alignment ability may be obtained. The reason therefor is not clear but surmised as follows. That is to say, the photo-alignment constitutional unit represented by the formula (1) includes a styrene skeleton and contains many n-electron systems. Also, generally, many liquid crystal molecules have an aromatic ring such as a benzene ring and contain n-electron systems similarly. In addition, in the photo-alignment constitutional unit represented by the formula (1), $L^1$ is a single bond or a divalent linking group with short chain length, and the photo-alignment group and the styrene skeleton are so close that the structure becomes similar to a structure of a liquid crystal molecule, compared with a divalent linking group with comparatively long chain length. Thus, the alignment layer formed from the thermosetting composition with a photo-alignment property of an embodiment of the present invention may be strong in the interaction with the liquid crystal molecules. In these manners, it is conceived that the liquid crystal molecules may be easily controlled, and thus favorable liquid crystal alignment ability may be obtained. Also, in the liquid crystal alignment layer formed from the thermosetting composition with a photo-alignment property of an embodiment of the present invention, it is conceived that the adhesion properties to a liquid crystal layer disposed on this liquid crystal alignment layer may also be improved by the interaction of π-electron systems.

Also, the thermosetting composition with a photo-alignment property of an embodiment of the present invention includes a thermosetting property to allow the alignment layer excellent in thermal stability and solvent resistance to be obtained. Also, the thermosetting composition with a photo-alignment property of an embodiment of the present invention is highly sensitive so that the liquid crystal alignment ability may be obtained even in the case the content of the photo-alignment constitutional unit in the copolymer is comparatively small. Thus, the content of the thermosetting constitutional unit in the copolymer may be relatively increased and thus thermal stability and solvent resistant may further be improved.

Further, the thermosetting composition is suitable for mass production by reason of high sensitivity, and the productivity of a device including the alignment layer formed from the thermosetting composition with a photo-alignment property may be also improved.

Each component in the thermosetting composition with a photo-alignment property of an embodiment of the present invention is hereinafter described.

1. Copolymer

A copolymer used for an embodiment of the present invention contains the photo-alignment constitutional unit represented by the formula (1) and a thermal cross-linking constitutional unit.

Each constitutional unit in the copolymer is hereinafter described.

(1) Photo-Alignment Constitutional Unit

The photo-alignment constitutional unit in an embodiment of the present invention is represented by the following formula (1), and is a site for developing anisotropy by causing a photo-isomerization reaction or a photo-dimerization reaction due to light irradiation.

[Chemical Formula 3]

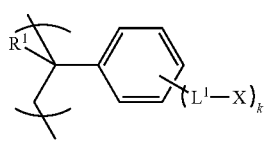
(1)

(In the formula (1), X represents a photo-alignment group causing a photo-isomerization reaction or a photo-dimerization reaction, $L^1$ represents a single bond, —O—, —S—, —COO—, —COS—, —CO—, —OCO—, —OCO(CH$_2$)$_n$COO—, —OCOCH$_2$CH$_2$OCH$_2$CH$_2$COO—, —OCOC$_6$H$_4$O—, —OCOC$_6$H$_{10}$O—, —COO(CH$_2$)$_n$O—, —COOC$_6$H$_4$O—, —COOC$_6$H$_{10}$O—, —O(CH$_2$)$_n$O—, —OC$_6$H$_4$O—, —OC$_6$H$_{10}$O—, or —(CH$_2$)$_n$O—, n represents 1 to 4, $R^1$ represents a hydrogen atom or a monovalent organic group, and k represents 1 to 5.)

X in the formula (1) is a photo-alignment group for causing a photo-isomerization reaction or a photo-dimerization reaction.

Examples of the photo-alignment group which causes a photo-dimerization reaction may include a cinnamoyl group, a chalcone group, a coumarin group, an anthracene group, a quinoline group, an azobenzene group, and a stilbene group. A benzene ring in these functional groups may include a substituent. The substituent may be such as not to prevent a photo-dimerization reaction, and examples thereof may include an alkyl group, an aryl group, a cycloalkyl group, an alkoxy group, a hydroxy group, a halogen atom, a trifluoromethyl group, and a cyano group.

The photo-alignment group which causes a photo-isomerization reaction is preferably such as to cause a cis-trans isomerization reaction, and examples thereof may include a cinnamoyl group, a chalcone group, an azobenzene group, and a stilbene group. A benzene ring in these functional groups may include a substituent. The substituent may be such as not to prevent a photo-isomerization reaction, and examples thereof may include an alkoxy group, an alkyl group, a halogen atom, a trifluoromethyl group, and a cyano group.

Above all, the photo-alignment group is preferably a cinnamoyl group. Specifically, the cinnamoyl group is preferably a group represented by the following formulae (2-1) and (2-2).

[Chemical Formula 4]

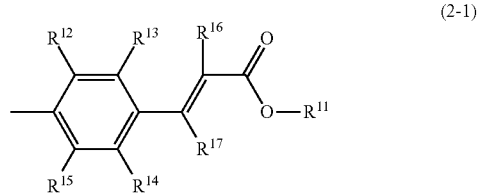
(2-1)

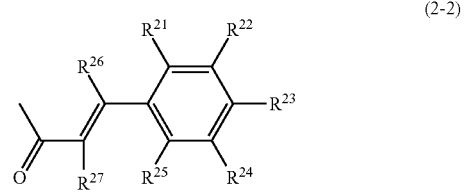
(2-2)

In the formula (2-1), $R^{11}$ represents a hydrogen atom, an alkyl group with a carbon number of 1 to 18, an aryl group with a carbon number of 1 to 18 or a cycloalkyl group with a carbon number of 1 to 18. However, the alkyl group, the aryl group and the cycloalkyl group may be bonded through an ether linkage, an ester linkage, an amide linkage, and a urea linkage, and may include a substituent. $R^{12}$ to $R^{15}$ each independently represent a hydrogen atom, a halogen atom, an alkyl group with a carbon number of 1 to 18, an aryl group with a carbon number of 1 to 18 or a cycloalkyl group with a carbon number of 1 to 18, an alkoxy group with a carbon number of 1 to 18 or a cyano group. However, the alkyl group, the aryl group and the cycloalkyl group may be bonded through an ether linkage, an ester linkage, an amide linkage, and a urea linkage, and may include a substituent.

$R^{16}$ and $R^{17}$ each independently represent a hydrogen atom, a halogen atom, an alkyl group with a carbon number of 1 to 18, an aryl group with a carbon number of 1 to 18 or an alkoxy group with a carbon number of 1 to 18.

Also, in the formula (2-2), $R^{21}$ to $R^{25}$ each independently represent a hydrogen atom, a halogen atom, an alkyl group with a carbon number of 1 to 18, an aryl group with a carbon number of 1 to 18 or a cycloalkyl group with a carbon number of 1 to 18, an alkoxy group with a carbon number of 1 to 18 or a cyano group. However, the alkyl group, the aryl group and the cycloalkyl group may be bonded through an ether linkage, an ester linkage, an amide linkage, and a urea linkage, and may include a substituent. $R^{26}$ and $R^{27}$ each independently represent a hydrogen atom, a halogen atom, an alkyl group with a carbon number of 1 to 18, an aryl group with a carbon number of 1 to 18 or an alkoxy group with a carbon number of 1 to 18.

Incidentally, in the case the photo-alignment group is a cinnamoyl group, which is represented by the formula (2-1), a benzene ring of a styrene skeleton may be a benzene ring of the cinnamoyl group.

L in the formula (1) is a single bond, —O—, —S—, —COO—, —COS—, —CO—, —OCO—, —OCO(CH$_2$)$_n$COO—, —OCOCH$_2$CH$_2$OCH$_2$CH$_2$COO—, —OCOC$_6$H$_4$O—, —OCOC$_6$H$_{10}$O—, —COO(CH$_2$)$_n$O—, —COOC$_6$H$_4$O—, —COOC$_6$H$_{10}$O—, —O(CH$_2$)$_n$O—, —OC$_6$H$_4$O—, —OC$_6$H$_{10}$O—, or —(CH$_2$)$_n$O—, and "n" is 1 to 4. Incidentally, in the case $L^1$ is a single bond, the photo-alignment group X is directly bonded to a styrene skeleton.

Above all, L is preferably a single bond, —O—, —S—, —COO—, —COS—, —CO—, or —OCO—. $L^1$ is a single bond or the chain length of the divalent linking group is further shortened so that the photo-alignment group and the styrene skeleton may be further closer in the photo-alignment constitutional unit. Thus, it is surmised that the photo-alignment group is in the positional relationship of easily causing a photo-isomerization reaction or a photo-dimerization reaction. For example, in the case of a photo-isomerization reaction, it is conceived that styrene skeletons of the photo-alignment constitutional unit are stacked and the photo-alignment group and the styrene skeleton are so close that the photo-alignment group is easily aligned to further improve photo-isomerization reactivity. Also, in the case of a photo-dimerization reaction, it is conceived that styrene skeletons of the photo-alignment constitutional unit are stacked and the photo-alignment group and the styrene skeleton are so close that the distance between the photo-alignment groups is shortened to further improve photo-dimerization reactivity. Accordingly, the sensitivity may be further improved. Also, the photo-alignment group and the styrene skeleton are so close in the photo-alignment constitutional unit that the structure becomes further similar to a structure of a liquid crystal molecule. Thus, it is conceived that an affinity with a liquid crystal layer disposed on the alignment layer becomes so high as to improve liquid crystal alignment ability and adhesion properties to the liquid crystal layer.

$R^1$ in the formula (1) is a hydrogen atom or a monovalent organic group. The monovalent organic group is preferably a methyl group. Above all, $R^1$ is preferably a hydrogen atom.

In the formula (1), "k" is 1 to 5, and -$L^1$-X may be bonded to any of an ortho-position, a meta-position, and a para-position. In the case "k" is 2 to 5, $L^1$ and X may be the same or different mutually. Above all, it is preferable that "k" is 1, and -$L^1$-X is bonded to a para-position. Specifically, the photo-alignment constitutional unit is preferably a constitutional unit represented by the following formula (1-1). Incidentally, in the following formula, each sign is the same as in the formula (1).

[Chemical Formula 5]

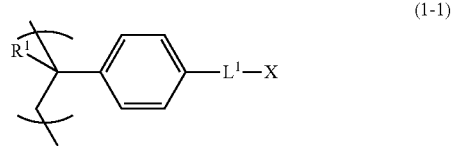

(1-1)

A constitutional unit represented by the following formulae (1-2) to (1-5) may be exemplified as the photo-alignment constitutional unit.

[Chemical Formula 6]

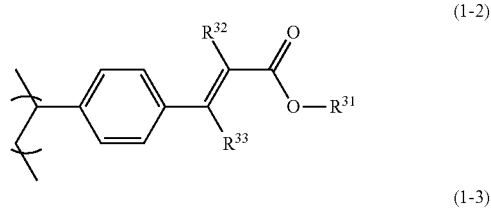

(1-2)

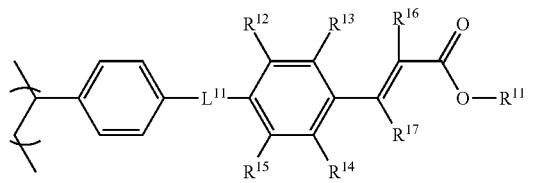

(1-3)

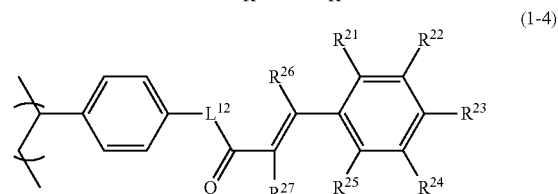

(1-4)

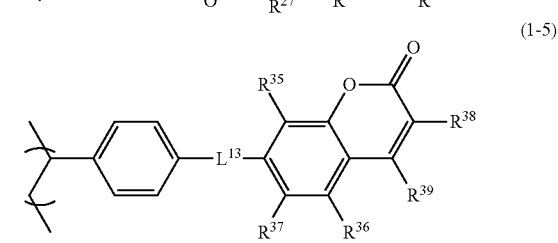

(1-5)

In the formula (1-2), $R^{31}$ is the same as $R^{11}$ of the formula (2-1), and $R^{32}$ and $R^{33}$ are the same as $R^{16}$ and $R^{17}$ of the formula (2-1).

In the formula (1-3), $L^{11}$ is the same as $L^1$ of the formula (1), and $R^{11}$ to $R^{17}$ are the same as in the formula (2-1).

In the formula (1-4), $L^{12}$ is the same as $L^1$ of the formula (1) except for —COS— and —CO—.

In the formula (1-5), $L^{13}$ is the same as $L^1$ of the formula (1). $R^{35}$ to $R^{37}$ are the same as $R^{12}$ to $R^{15}$ of the formula (2-1), and $R^{38}$ and $R^{39}$ are the same as $R^{16}$ and $R^{17}$ of the formula (2-1).

The photo-alignment constitutional unit of the copolymer may be one kind, or two kinds or more.

Above all, the photo-alignment constitutional unit is preferably a constitutional unit represented by the formulae (1-3) and (1-4).

In the formula (1-3), $L^{11}$ is preferably —O—, —S—, —COO—, —COS—, —CO—, or —OCO— in view of sensitivity.

Also, the photo-alignment constitutional unit represented by the formula (1-3) is more preferably a constitutional unit represented by the following formula (1-6).

[Chemical Formula 7]

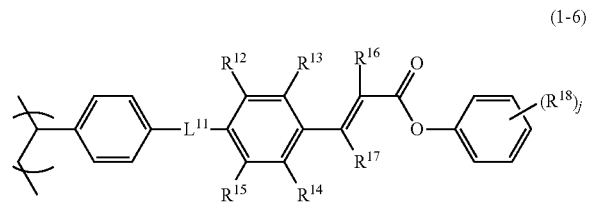

(1-6)

In the formula (1-6), $R^{12}$ to $R^{17}$ and $L^{11}$ are the same as in the formula (1-3). $R^{18}$ represents a hydrogen atom, an alkoxy group with a carbon number of 1 to 18, a cyano group, an alkyl group with a carbon number of 1 to 18, a phenyl group, a biphenyl group or a cyclohexyl group. However, the alkyl group, the phenyl group, the biphenyl group and the cyclohexyl group may be bonded through an ether linkage, an ester linkage, an amide linkage, and a urea linkage. The value "j" represents 1 to 5, and $R^{18}$ may be bonded to any of an ortho-position, a meta-position, and a para-position. In the case "j" is 2 to 5, $R^{18}$ may be the same or different mutually. Above all, it is preferable that "j" is 1, and $R^{18}$ is bonded to a para-position.

Also, in the formula (1-4), $L^{12}$ is preferably —O—, —S—, —COO—, or —OCO— in view of sensitivity.

In the case the photo-alignment constitutional unit is a constitutional unit represented by the formulae (1-6) and (1-4), an aromatic ring is disposed in the vicinity of the end of the photo-alignment constitutional unit to contain many r-electrons. Thus, an affinity for a liquid crystal layer disposed on the alignment layer is conceived to become so higher as to improve adhesion properties to the liquid crystal layer.

Also, in this case, it is conceived that the photo dimerization reaction is easily caused. A double bond of a cinnamoyl group for causing the photo-dimerization reaction is so close to the styrene skeleton that styrene skeletons in the photo-alignment constitutional unit are stacked, and thus the distance between the double bonds of the cinnamoyl group for causing the photo-dimerization reaction may be further shortened. Thus the photo-dimerization reactivity may be further increased and sensitivity may be further improved.

A styrene-based monomer including the photo-alignment group for forming the photo-alignment constitutional unit may be used for synthesizing the copolymer. The styrene-based monomer including the photo-alignment group may be used singly or in combination of two kinds or more.

The content of the photo-alignment constitutional unit in the copolymer may be determined within a range of about 10% by mol to 90% by mol, preferably within a range of about 20% by mol to 80% by mol when the whole copolymer is regarded as 100% by mol. The low content of the photo-alignment constitutional unit occasionally deteriorates sensitivity to allow favorable liquid crystal alignment ability with difficulty. Also, the high content of the photo-alignment constitutional unit occasionally decreases the content of the thermal cross-linking constitutional unit relatively to maintain favorable liquid crystal alignment ability with difficulty by reason of not obtaining a sufficient thermosetting property.

Incidentally, the content of each constitutional unit in the copolymer may be calculated from an integral value by $^{1}H$ NMR measurement.

(2) Thermal Cross-Linking Constitutional Unit

The thermal cross-linking constitutional unit in an embodiment of the present invention is a site for bonding to a cross-linking agent by heating.

The thermal cross-linking constitutional unit includes a thermal cross-linking group. Examples of the thermal cross-linking group may include a hydroxy group, a carboxy group, a phenolic hydroxy group, a mercapto group, a glycidyl group, and an amide group. Above all, from the viewpoint of reactivity, an aliphatic hydroxy group is preferable, and a primary hydroxy group is more preferable.

Examples of a monomer unit constituting the thermal cross-linking constitutional unit may include acrylate, methacrylate, styrene, acrylamide, methacrylamide, maleimide, vinyl ether, and vinyl ester. Above all, acrylate, methacrylate, and styrene are preferable. Also, as described later, in the case the thermal cross-linking constitutional unit includes a self-cross-linkable cross-linking group, acrylate, methacrylate, acrylamide, methacrylamide, and styrene are preferable.

The monomer of acrylate and methacrylate has the advantages that solubility is high, easily obtained as a commercial product, and reactivity during copolymerization is favorable.

Also, in the case of styrene, in the copolymer, not only the photo-alignment constitutional unit but also the thermal cross-linking constitutional unit includes a styrene skeleton so as to allow the copolymer to contain many r-electron systems. Thus, in the case of forming an alignment layer by using the thermosetting composition with a photo-alignment property of an embodiment of the present invention, an interaction of the n-electron systems is conceived to allow liquid crystal alignment ability and adhesion properties to a liquid crystal layer to be improved.

Also, the monomer of acrylamide and methacrylamide, to which the self-cross-linkable cross-linking group such as an N-alkoxymethyl group and an N-hydroxymethyl group is bonded, has the advantages that easily available as a commercial product and reactivity is favorable.

A constitutional unit represented by the following formula (3) may be exemplified as the thermal cross-linking constitutional unit.

[Chemical Formula 8]

(3)

In the formula (3), $Z^{1}$ represents a monomer unit and examples thereof may include acrylate, methacrylate, acrylamide, methacrylamide, styrene, maleimide, vinyl ether and vinyl ester. Above all, as described above, acrylate, methacrylate, and styrene are preferable. Also, in the case the thermal cross-linking constitutional unit includes a self-cross-linkable cross-linking group, as described above, acrylate, methacrylate, acrylamide, methacrylamide, and styrene are preferable. Specific examples thereof may include a monomer unit represented by the following formula.

[Chemical Formula 9]

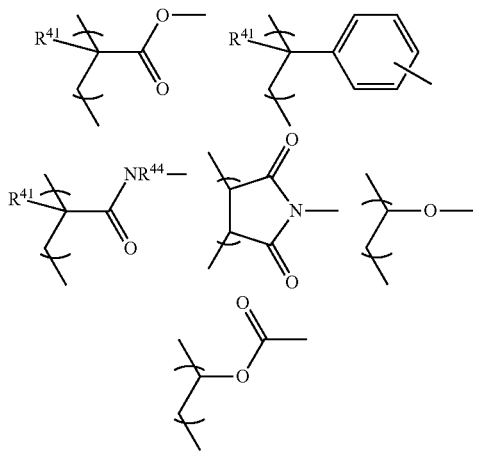

(In the formula, $R^{41}$ represents a hydrogen atom, a methyl group, a chlorine atom or a phenyl group, $R^{42}$ represents a hydrogen atom or a methyl group, $R^{43}$ represents a hydrogen atom, a methyl group, a chlorine atom or a phenyl group, and $R^{44}$ represents a hydrogen atom or a lower alkyl group.)

In the case the monomer unit is styrene, -$L^2$-Y may be bonded to any of an ortho-position, a meta-position, and a para-position, or a plurality thereof. In the case of a plurality, $L^2$ and Y may be the same or different mutually. Above all, it is preferable that -$L^2$-Y is one and bonded to a para-position.

In the formula (3), Y represents the thermal cross-linking group, and examples thereof may include a hydroxy group, a carboxy group, a phenolic hydroxy group, a mercapto group, a glycidyl group, and an amide group. Above all, as described above, from the viewpoint of reactivity, an aliphatic hydroxy group is preferable, and a primary hydroxy group is more preferable. Also, in the case the thermal cross-linking constitutional unit includes a self-cross-linkable cross-linking group as the thermal cross-linking group, Y represents the self-cross-linkable cross linking group; as described later, examples thereof may include a phenolic hydroxy group of which ortho-position is substituted with a hydroxymethyl group or an alkoxymethyl group, a glycidyl group, an amide group, an N-alkoxymethyl group, and an N-hydroxymethyl group.

In the formula (3), $L^2$ represents a single bond or a divalent linking group. Incidentally, in the case $L^2$ is the single bond, the thermal cross-linking group Y is directly bonded to the monomer unit $Z^2$. Examples of the divalent linking group may include an ether linkage, a thioether linkage, an ester linkage, a thioester linkage, a carbonyl linkage, a thiocarbonyl linkage, an alkylene group, an arylene group, a cycloalkylene group, and combinations of these. Above all, the divalent cross-linking group preferably include —$(CH_2)_n$— or —$(C_2H_4O)_m$—, "n" is preferably 4 to 11, and "m" is preferably 2 to 5. When "n" and "m" are too small, the distance between the thermal cross-linking group and the main skeleton of the copolymer is shortened in the thermal cross-linking constitutional unit so that a cross-linking agent bonds to the thermal cross-linking group with difficulty to bring a possibility of deteriorating reactivity between the thermal cross-linking constitutional unit and the cross-linking agent. On the other hand, when "n" and "m" are too large, the chain length of the linking group increases in the thermal cross-linking constitutional unit so that the thermal cross-linking group at the end comes out on the surface with difficulty and a cross-linking agent bonds to the thermal cross-linking group with difficulty to bring a possibility of deteriorating reactivity between the thermal cross-linking constitutional unit and the cross-linking agent.

Incidentally, for example, in the case $L^2$ is —$(C_2H_4O)_m$—, and Y is a hydroxy group, -$L^2$-Y may be —$(C_2H_4O)_m$—H.

Also, in the formula (3), the thermal cross-linking group Y is bonded to the monomer unit $Z^1$ via a divalent cross-linking group or the single bond $L^2$, but in the case Y is a carboxy group or a hydroxy group, the thermal cross-linking constitutional unit represented by the formula (3) may be the constitutional unit represented by the following formula. Incidentally, in the following formula, each sign is the same as in the above formula.

[Chemical Formula 10]

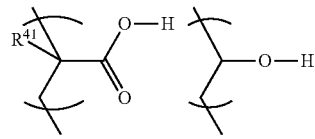

Also, the thermal cross-linking constitutional unit may include a cross-linking group. In this case, the thermal cross-linking constitutional unit may also serve as a cross-linking agent. That is to say, the cross-linking group is a self-cross-linkable group. Also, the thermal cross-linking constitutional unit includes the cross-linking group as the thermal cross-linking group.

Here, self-cross-linking signifies that the same functional groups or different functional groups react without the cross-linking agent to form a cross-linking structure.

In the case of using the copolymer including such a thermal cross-linking constitutional unit, the thermosetting composition with a photo-alignment property of an embodiment of the present invention may be utilized without adding the cross-linking agent. Thus, the content of the copolymer in the thermosetting composition with a photo-alignment property may be increased relatively and the content of the photo-alignment constitutional unit for contributing to the alignment may be increased relatively to improve photoreactivity. Also, generally, the cross-linking agent is a low-molecular component, and no addition of the cross-linking agent may prevent the cross-linking agent from coming up to the surface of the alignment layer, that is, bleedout, and may inhibit liquid crystal alignment ability from being hindered. Accordingly, photoreactivity and sensitivity may be further improved.

Meanwhile, it is preferable that the thermal cross-linking constitutional unit does not include a cross-linking group in view of storage stability.

Examples of the thermal cross-linking constitutional unit including the cross-linking group may include one including a phenolic hydroxy group of which ortho-position is substituted with a hydroxymethyl group or an alkoxymethyl group, a glycidyl group, an amide group, an N-alkoxymethyl group, and an N-hydroxymethyl group.

Examples of a monomer for forming such a thermal cross-linking constitutional unit may include an acrylate compound, a methacrylate compound, an acrylamide compound, a methacrylamide compound, a styrene compound, a maleimide compound, and a vinyl compound.

Examples of the acrylate compound and the methacrylate compound may include a monomer including a hydroxy group and an acryl group or a methacryl group such as 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate, 2,3-dihydroxypropyl acrylate, 2,3-dihydroxypropyl methacrylate, diethylene glycol monoacrylate, diethylene glycol monomethacrylate, triethylene glycol monoacrylate, tetraethylene glycol monoacrylate, dipropylene glycol monoacrylate, tripropylene glycol monoacrylate, and tetrapropylene glycol monoacrylate.

Examples of the acrylamide compound and the methacrylamide compound may include a monomer including a hydroxy group and an acrylamide group or a methacrylamide group such as 2-hydroxyethyl acrylamide, 2-hydroxyethyl methacrylamide, 2-hydroxypropyl acrylamide, 2-hydroxypropyl methacrylamide, 4-hydroxybutyl acrylamide, and 4-hydroxybutyl methacrylamide.

Examples of the vinyl compound may include a monomer including a hydroxy group and a vinyl group such as 2-hydroxyethyl vinyl ether, 3-hydroxypropyl vinyl ether, 4-hydroxybutyl vinyl ether, diethylene glycol monovinyl ether, and 3-hydroxy vinylpropionate.

Examples of the styrene compound may include a monomer including a hydroxy group and a styrene group such as an ester compound of 4-vinyl benzoate and diol, an ester compound of 4-vinyl benzoate and diethylene glycol, an ether compound of hydroxystyrene and diol, and an ether compound of hydroxystyrene and diethylene glycol.

Examples of the maleimide compound may include a monomer including a hydroxy group and a maleimide group such as N-(2-hydroxyethyl)maleimide and N-hydroxy maleimide.

Also, a monomer including a phenolic hydroxyl group such as hydroxystyrene, N-(hydroxyphenyl)methacrylamide, N-(hydroxyphenyl) acrylamide, and N-(hydroxyphenyl) maleimide, a monomer including a carboxy group such as acrylic acid, methacrylic acid, crotonic acid, mono-(2-(acryloyloxy)ethyl)phthalate, mono-(2-(metacryloyloxy)ethyl) phthalate, N-(carboxyphenyl)maleimide, N-(carboxyphenyl)methacrylamide, and N-(carboxyphenyl)acrylamide, and monomers including a glycidyl group such as glycidyl methacrylate and glycidyl acrylate may be exemplified.

The thermal cross-linking constitutional unit of the copolymer may be one kind, or two kinds or more. For example, the copolymer may include the thermal cross-linking constitutional unit including a non-self-cross-linkable thermal cross-linking group, and the thermal cross linking constitutional unit including a self-cross-linkable cross-linking group as the thermal cross-linking group.

A monomer including a thermal cross-linking group for forming the thermal cross-linking constitutional unit may be used for synthesizing the copolymer. The monomer including the thermal cross-linking group may be used singly or in combination of two kinds or more.

The content of the thermal cross-linking constitutional unit in the copolymer may be determined in the range of about 10% by mol to 90% by mol, and is preferably within a range of about 20% by mol to 80% by mol when the whole copolymer is regarded as 100% by mol. The low content of the thermal cross-linking constitutional unit occasionally maintains favorable liquid crystal alignment ability with difficulty by reason of not obtaining a sufficient thermosetting property. Also, the high content of the thermal cross-linking constitutional unit occasionally decreases the content of the photo-alignment constitutional unit relatively to deteriorate sensitivity and allow favorable liquid crystal alignment ability with difficulty.

(3) Another Constitutional Unit

In an embodiment of the present invention, the copolymer may include a constitutional unit including neither photo-alignment groups nor thermal cross-linking groups other than the photo-alignment constitutional unit and the thermal cross-linking constitutional unit. The inclusion of another constitutional unit in the copolymer allows abilities such as solvent solubility, thermal stability, and reactivity to be improved.

Examples of a monomer unit constituting the constitutional unit not including photo-alignment groups or thermal cross-linking groups may include acrylate, methacrylate, maleimide, acrylamide, acrylonitrile, maleic anhydride, styrene, and vinyl. Above all, similarly to the thermal cross-linking constitutional unit, acrylate, methacrylate, and styrene are preferable.

Examples of a monomer for forming such a constitutional unit not including photo-alignment groups or thermal cross-linking groups may include an acrylate compound, a methacrylate compound, a maleimide compound, an acrylamide compound, acrylonitrile, maleic anhydride, a styrene compound, and a vinyl compound.

Examples of the acrylate compound may include methyl acrylate, ethyl acrylate, isopropyl acrylate, benzyl acrylate, naphtyl acrylate, anthryl acrylate, anthrylmethyl acrylate, phenyl acrylate, glycidyl acrylate, 2,2,2-trifluoroethyl acrylate, tert-butyl acrylate, cyclohexyl acrylate, isobornyl acrylate, 2-methoxyethyl acrylate, methoxytriethylene glycol acrylate, 2-ethoxyethyl acrylate, 2-aminoethyl acrylate, tetrahydrofurfuryl acrylate, 3-methoxybutyl acrylate, 2-methyl-2-adamantyl acrylate, 2-propyl-2-adamantyl acrylate, 8-methyl-8-tricyclodecyl acrylate, and 8-ethyl-8-tricyclodecyl acrylate.

Examples of the methacrylate compound may include methyl methacrylate, ethyl methacrylate, isopropyl methacrylate, benzyl methacrylate, naphtyl methacrylate, anthryl methacrylate, anthrylmethylmethacrylate, phenylmethacrylate, glycidyl methacrylate, 2,2,2-trifluoroethyl methacrylate, tert-butyl methacrylate, cyclohexyl methacrylate, isobornyl methacrylate, 2-methoxyethyl methacrylate, methoxytriethylene glycol methacrylate, 2-ethoxyethyl methacrylate, 2-aminomethyl methacrylate, tetrahydrofurfuryl methacrylate, 3-methoxybutyl methacrylate, 2-methyl-2-adamantyl methacrylate, γ-butyrolactone methacrylate, 2-propyl-2-adamantyl methacrylate, 8-methyl-8-tricyclodecyl methacrylate and 8-ethyl-8-tricyclodecyl methacrylate.

Examples of the vinyl compound may include methyl vinyl ether, benzyl vinyl ether, vinylnaphthalene, vinylcarbazole, allylglycidyl ether, 3-ethenyl-7-oxabicyclo[4.1.0]heptane, 1,2-epoxy-5-hexene and 1,7-octadiene monoepoxide.

Examples of the styrene compound may include styrene, para-methyl styrene, α-methyl styrene, chlorostyrene, bromostyrene, para-trifluoromethyl styrene, para-trifluoromethyl-α-methyl styrene, 4(4-trifluoromethylbenzoyloxy)styrene, para-cetyloxystyrene, and para-palmitoyloxystyrene.

Examples of the maleimide compound may include maleimide, N-methylmaleimide, N-phenylmaleimide and N-cyclohexylmaleimide.

The constitutional unit not including photo-alignment groups or thermal cross-linking groups in the copolymer may be one kind, or two kinds or more.

The content of the constitutional unit in the copolymer is preferably within a range of about 0% by mol to 50% by mol, and more preferably within a range of about 0% by mol to 30% by mol when the whole copolymer is regarded as 100% by mol. The high content of the constitutional unit occasionally decreases the content of the photo-alignment constitutional unit and the thermal cross-linking constitutional unit relatively, to deteriorate sensitivity, allow favorable liquid crystal alignment ability with difficulty, allow no sufficient thermosetting property and maintain favorable liquid crystal alignment ability with difficulty.

(4) Copolymer

The number-average molecular weight of the copolymer is not particularly limited and may be determined at approximately 3,000 to 200,000, and preferably within a range of about 4,000 to 100,000. Too large number-average molecular weight occasionally deteriorates handleability by reason of decreasing solubility in solvent and increasing viscosity to form a uniform film with difficulty. Also, too small number-average molecular weight occasionally deteriorates solvent resistance and thermal stability by reason of curing shortage during thermal curing.

Incidentally, the number-average molecular weight may be measured by a gel permeation chromatography (GPC) method.

Examples of a synthesis method for the copolymer may include a method for copolymerizing a styrene-based monomer including the photo-alignment group and a styrene-based monomer including the thermal cross-linking group.

The synthesis method for the copolymer is not particularly limited, but the copolymer may be obtained by polymerization in a solvent in which a styrene-based monomer including the photo-alignment group, a styrene-based monomer including the thermal cross-linking group, and a polymerization initiator coexist. On that occasion, the solvent to be used is not particularly limited if it dissolves a styrene-based monomer including the photo-alignment group, a styrene-based monomer including the thermal cross-linking group and a polymerization initiator. Specifically, the solvent may be the same as the after-mentioned solvent used for the thermosetting composition with a photo-alignment property. Also, the temperature during the polymerization reaction may be determined at approximately 50° C. to 120° C. The copolymer obtained by the method is ordinarily in a state of a solution dissolved in the solvent.

The copolymer obtained by the method may be used directly or used after being purified by the method described below.

That is to say, the solution of the copolymer obtained by the method is projected into diethyl ether, methanol or water while stirred, and reprecipitated, and then the produced precipitate is filtered, washed and thereafter subjected to drying at room temperature or drying by heating under normal pressure or reduced pressure to obtain powder of the copolymer. The polymerization initiator and unreacted monomer coexisting with the copolymer may be removed by this process to consequently allow purified powder of the copolymer to be obtained. In the case of being incapable of sufficient purification in one process, the obtained powder may be redissolved in the solvent to repeat the process.

The copolymer may be used in the form of the solution during the synthesis thereof, in the form of the powder, or in the form of the solution in which the purified powder is redissolved in the after-mentioned solvent.

Also, the copolymer may be one kind or a mixture of plural kinds of copolymers.

2. Cross-Linking Agent

The thermosetting composition with a photo-alignment property of an embodiment of the present invention preferably contains a cross-linking agent. The cross-linking agent bonds to the thermal cross-linking constitutional unit of the copolymer, and allows thermal stability and solvent resistance to be improved. Meanwhile, in view of photoreactivity and sensitivity, it is preferable that the thermosetting composition with a photo-alignment property of an embodiment of the present invention does not contain a cross-linking agent.

Examples of the cross-linking agent may include an epoxy compound, a methylol compound, and an isocyanato compound. Above all, a methylol compound is preferable.

Examples of the methylol compound may include alkoxymethylated glycoluril, alkoxymethylated benzoguanamine, and alkoxymethylated melamine.

Examples of the alkoxymethylated glycoluril may include 1,3,4,6-tetrakis(methoxymethyl)glycoluril, 1,3,4,6-tetrakis(butoxymethyl)glycoluril, 1,3,4,6-tetrakis(hydroxymethyl)glycoluril, 1,3-bis(hydroxymethyl)urea, 1,1,3,3-tetrakis(butoxymethyl)urea, 1,1,3,3-tetrakis(methoxymethyl)urea, 1,3-bis(hydroxymethyl)-4,5-dihydroxy-2-imidazolinone and 1,3-bis(methoxymethyl)-4,5-dimethoxy-2-imidazolinone. Examples of a commercial product thereof may include a compound such as a glycoluril compound (trade name CYMEL 1170 and POWDERLINK 1174), methylated urea resin (trade name UFR65) and butylated urea resin (trade name UFR300, U-VAN10S60, U-VAN10R and U-VAN11HV) manufactured by Mitsui Cytec Ltd., urea/formaldehyde resin (high condensation type, trade name BECKAMINE J-300S, BECKAMINE P-955, and BECKAMINE N) manufactured by DIC Corporation, and a glycoluril compound (trade name NIKALAC MX-270), and an imidazolidine compound (trade name NIKALAC MX-280) manufactured by SANWA CHEMICAL CO., LTD.

Examples of the alkoxymethylated benzoguanamine may include tetramethoxymethylbenzoguanamine. Examples of a commercial product thereof may include products (trade name CYMEL 1123) manufactured by Mitsui Cytec Ltd., and (trade name NIKALAC BX-4000, NIKALAC BX-37, NIKALAC BL-60, and NIKALAC BX-55H) manufactured by SANWA CHEMICAL CO., LTD.

Examples of the alkoxymethylated melamine may include hexamethoxymethylmelamine. Examples of a commercial product thereof may include methoxymethyl type melamine compounds (trade name CYMEL 300, CYMEL 301, CYMEL 303, CYMEL 350, and CYMEL 3745), and butoxymethyl type melamine compounds (trade name MYCOAT 506, MYCOAT 508, and CYMEL 1156) manufactured by Mitsui Cytec Ltd., and methoxymethyl type melamine compounds (trade name NIKALAC MW-30, MW-22, MW-11, MS-001, MX-002, MX-730, MX-750, MX-035, MW-390, MW-100LM, and MX-750LM), and butoxymethyl type melamine compounds (trade name NIKALAC MX-45, MX-410, and MX-302) manufactured by SANWA CHEMICAL CO., LTD.

Also, a cross-linking agent containing plural benzene rings in a molecule may be utilized. Examples of the cross-linking agent containing plural benzene rings in a molecule may include a phenol derivative with a molecular weight of 1200 or less, including two or more of a hydroxymethyl group or an alkoxymethyl group in total, and a melamine-formaldehyde derivative and an alkoxymethylglycoluril derivative including at least two free N-alkoxymethyl groups. The phenol derivative including a hydroxymethyl group may be obtained by reacting a phenol compound not including the corresponding hydroxymethyl group with formaldehyde under a base catalyst.

Also, the cross-linking agent may be a compound obtained by condensing such melamine compound, urea compound, glycoluril compound, and benzoguanamine compound in which a hydrogen atom of an amino group is substituted with a methylol group or an alkoxymethyl group. Examples thereof may include a high-molecular-weight compound produced from the melamine compound and the benzoguanamine compound described in U.S. Pat. No. 6,323,310. Examples of a commercial product of the melamine compound may include trade name CYMEL 303 (manufactured by Mitsui Cytec Ltd.). Examples of a commercial product of the benzoguanamine compound may include trade name CYMEL 1123 (manufactured by Mitsui Cytec Ltd.).

In addition, a polymer produced by using an acrylamide compound or a methacrylamide compound substituted with a hydroxymethyl group or an alkoxymethyl group, such as N-hydroxymethylacrylamide, N-methoxymethylmethacrylamide, N-ethoxymethylacrylamide, and N-butoxymethylmethacrylamide, may be used as the cross-linking agent. Examples of such a polymer may include poly(N-butoxymethylacrylamide), a copolymer of N-butoxymethylacrylamide and styrene, a copolymer of N-hydroxymethylmethacrylamide and methyl methacrylate, a copolymer of N-ethoxymethylmethacrylamide and benzyl methacrylate, and a copolymer of N-butoxymethylacrylamide, benzyl methacrylate, and 2-hydroxypropyl methacrylate. The weight-average molecular weight of such a polymer is within a range of about 1,000 to 500,000, preferably within a range of about 2,000 to 200,000, more preferably within a range of about 3,000 to 150,000, and further more preferably within a range of about 3,000 to 50,000.

These cross-linking agents may be used singly or in combination of two kinds or more.

The content of the cross-linking agent in the thermosetting composition with a photo-alignment property of an embodiment of the present invention is preferably within a range of about 1 part by mass to 40 parts by mass, and more preferably within a range of about 5 parts by mass to 30 parts by mass with respect to 100 parts by mass of the copolymer. Too small content brings a possibility of deteriorating thermal stability and solvent resistance of a cured film formed from the thermosetting composition with a photo-alignment property to deteriorate liquid crystal alignment ability. Also, too large content occasionally deteriorates liquid crystal alignment ability and storage stability.

3. Acid or Acid Generator

The thermosetting composition with a photo-alignment property of an embodiment of the present invention may contain an acid or an acid generator. An acid or an acid generator allows a thermosetting reaction of the thermosetting composition with a photo-alignment property of an embodiment of the present invention to be promoted.

The acid or the acid generator is not particularly limited if it is a sulfonic group-containing compound, hydrochloric acid or a salt thereof, and a compound which is thermally decomposed during drying and thermal curing of a coating film to generate an acid, namely, a compound which is thermally decomposed at a temperature of 50° C. to 250° C. to generate an acid. Examples of such a compound may include hydrochloric acid, and sulfonic acid or hydrates and salts thereof such as methansulfonic acid, ethansulfonic acid, propansulfonic acid, butansulfonic acid, pentansulfonic acid, octansulfonic acid, benzenesulfonic acid, para-toluenesulfonic acid, camphasulfonic acid, trifluoromethansulfonic acid, para-phenolsulfonic acid, 2-naphthalenesulfonic acid, mesitylenesulfonic acid, para-xylene-2-sulfonic acid, meta-xylene-2-sulfonic acid, 4-ethylbenzenesulfonic acid, 1H, 1H, 2H, 2H-perfluorooctansulfonic acid, perfluoro(2-ethoxyethane)sulfonic acid, pentafluoroethanesulfonic acid, nonafluorobutane-1-sulfonic acid, and dodecylbenezenesulfonic acid. Examples of a compound which generates an acid by heat may include bis(tosyloxy) ethane, bis(tosyloxy)propane, bis(tosyloxy)butane, para-nitrobenzyl tosylate, ortho-nitrobenzyl tosylate, 1,2,3-phenylenetris(methylsulfonate), para-toluenesulfonic acidpyridiniumsalt, para-toluenesulfonic acid morphonium salt, para-toluenesulfonic acid ethyl ester, para-toluenesulfonic acid propyl ester, para-toluenesulfonic acid butyl ester, para-toluenesulfonic acid isobutyl ester, para-toluenesulfonic acid methyl ester, para-toluenesulfonic acid phenethyl ester, cyanomethyl para-toluenesulfonate, 2,2,2-trifluoroethyl para-toluenesulfonate, 2-hydroxybutyl para-tosylate, and N-ethyl-4-toluenesulfonamide. Also, a compound described in WO 2010/150748 may be used as the compound which generates an acid by heat.

The content of the acid or the acid generator in the thermosetting composition with a photo-alignment property of an embodiment of the present invention is preferably within a range of about 0.01 part by mass to 20 parts by mass, more preferably within a range of about 0.05 part by mass to 10 parts by mass, and further more preferably within a range of about 0.1 part by mass to 5 parts by mass with respect to 100 parts by mass of the copolymer. The content of the acid or the acid generator within the range allows sufficient thermosetting property and solvent resistance, and high sensitivity to light irradiation. On the other hand, too large content occasionally deteriorates storage stability of the thermosetting composition with a photo-alignment property.

4. Sensitizer

The thermosetting composition with a photo-alignment property of an embodiment of the present invention may contain a sensitizer. A sensitizer allows a photoreaction such as a photo-dimerization reaction and a photo-isomerization reaction to be promoted.

Examples of the sensitizer may include benzophenone, anthracene, anthraquinone, thioxanthone, and derivatives of these, and a nitrophenyl compound. Among these, benzophenone derivatives and a nitrophenyl compound are preferable. Examples of the preferable compound may include N,N-diethylaminobenzophenone, 2-nitrofluorene, 2-nitrofluorenone, 5-nitroacenaphthene, and 4-nitrobiphenyl. In particular, N,N-diethylaminobenzophenone, which is a derivative for benzophenone, is preferable. The sensitizer may be used singly or in combination of two kinds or more of compounds together.

The content of the sensitizer in the thermosetting composition with a photo-alignment property of an embodiment of the present invention is preferably within a range of about 0.1 part by mass to 20 parts by mass, and more preferably within a range of about 0.2 part by mass to 10 parts by mass with respect to 100 parts by mass of the copolymer. Too small content occasionally does not allow a sufficient effect of the sensitizer, and too large content occasionally brings the deterioration of transmittance and roughness of a coating film.

5. Solvent

The thermosetting composition with a photo-alignment property of an embodiment of the present invention is mainly used in a solution state of being dissolved in a solvent.

The solvent is not particularly limited if it may dissolve each of the components, and examples thereof may include ethylene glycol monomethyl ether, ethylene glycolmonoethyl ether, methyl Cellosolve acetate, ethyl Cellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, ethylene glycol dimethyl ether, propylene glycol dimethyl ether, toluene, xylene, methyl ethyl ketone, cyclopentanone, cyclohexanone, 2-butanone, 3-methyl-2-pentanone, 2-pentanone, 2-heptanone, γ-butyrolactone, ethyl 2-hydroxypropionate, ethyl 2-hydroxy-2-methylpropionate, ethyl ethoxyacetate, ethyl hydroxyacetate, methyl 2-hydroxy-3-methylbutanoic acid, methyl 3-methoxypropionate, ethyl 3-methoxypropionate, ethyl 3-ethoxypropionate, methyl 3-ethoxypropionate, methyl pyruvate, ethyl pyruvate, ethyl acetate, butyl acetate, ethyl lactate, butyl lactate, N,N-dimethylformamide, N,N-dimethylacetamide, and N-methylpyrrolidone. The solvent may be used in one kind singly or in combination of two kinds or more.

Above all, propylene glycol monomethyl ether, propylene glycol monomethyl ether acetate, ethylene glycol dimethyl ether, propylene glycol dimethyl ether, methyl ethyl ketone, cyclohexanone, 2-heptanone, propylene glycol propyl ether, propylene glycol propyl ether acetate, ethyl lactate, butyl lactate, methyl 3-methoxypropionate, ethyl 3-methoxypropionate, ethyl 3-ethoxypropionate, and methyl 3-ethoxypropionate are preferable by reason of favorable film formation and high safety.

6. Addition Agent

The thermosetting composition with a photo-alignment property of an embodiment of the present invention may contain a silane coupling agent, a surface-active agent, a rheology adjustor, a pigment, dyestuffs, a storage stabilizer, an antifoaming agent and an antioxidant as required as long as the effect of an embodiment of the present invention is not deteriorated.

7. Thermosetting Composition with Photo-Alignment Property

The thermosetting composition with a photo-alignment property of an embodiment of the present invention is ordinarily used as a solution in which each of the components is dissolved in a solvent. The ratio of solid content in the thermosetting composition with a photo-alignment property of an embodiment of the present invention is not particularly limited if each of the components is uniformly dissolved in a solvent, and is within a range of about 0.1% by mass to 80% by mass, preferably within a range of about 0.5% by mass to 60% by mass, and more preferably within a range of about 0.5% by mass to 40% by mass. Too small ratio of solid content occasionally allows liquid crystal alignment ability and thermosetting property with difficulty. Also, too large ratio of solid content increases the viscosity of the thermosetting composition with a photo-alignment property to forma uniform film with difficulty.

Incidentally, the solid content signifies such that the solvent is removed from all components of the thermosetting composition with a photo-alignment property.

A method for preparing the thermosetting composition with a photo-alignment property of an embodiment of the present invention is not particularly limited but is preferably a method for mixing the copolymer, the cross-linking agent, the sensitizer and other addition agents to thereafter add the acid or the acid generator for the reason that storage stability is improved. Incidentally, in the case of adding the acid or the acid generator first, the compound which is thermally decomposed during drying and thermal curing of a coating film to generate an acid is preferably used as the acid or the acid generator.

A solution of the copolymer obtained by a polymerization reaction in the solvent may be used directly in the preparation of the thermosetting composition with a photo-alignment property of an embodiment of the present invention. In this case, as described above, the cross-linking agent, the sensitizer and other addition agents are projected into the solution of the copolymer to obtain the uniform solution, to which the acid or the acid generator is thereafter added. On this occasion, a solvent may be further added for the purpose of concentration adjustment. Then, the solvent used in the production process of the copolymer and the solvent used for concentration adjustment of the thermosetting composition with a photo-alignment property may be the same or different.

Also, the adjusted solution of the thermosetting composition with a photo-alignment property is preferably used after being filtered by using a filter with a pore diameter of approximately 0.2 μm.

8. Uses

Examples of the uses of the thermosetting composition with a photo-alignment property of an embodiment of the present invention may include an alignment layer of various optical elements such as a retardation plate, and an alignment layer of a liquid crystal display element. Also, the thermosetting composition with a photo-alignment property of an embodiment of the present invention may be used for an insulating film and a protective film in various devices such as a liquid crystal display element, an organic EL element, TFT, and a color filter; examples thereof may include an insulating film of an organic EL element, an interlayer insulating film of TFT, and an overcoat layer of a color filter.

B. Alignment Layer

An alignment layer of an embodiment of the present invention comprises a copolymer including a photo-alignment constitutional unit represented by the formula (1) and a cross-linking structure, and the alignment layer comprises a photo-dimerization structure or a photo-isomerization structure of a photo-alignment group in the photo-alignment constitutional unit.

Here, the cross-linking structure signifies a three-dimensional network structure. The after-mentioned structure such that photo-alignment groups are cross-linked by a photo-dimerization reaction is not included in the cross-linking structure.

According to an embodiment of the present invention, the alignment layer includes the predetermined copolymer and the predetermined photo-dimerization structure or photo-isomerization structure so that favorable liquid crystal alignment ability, thermal stability, and solvent resistant may be obtained.

The copolymer includes the photo-alignment constitutional unit represented by the formula (1), and a cross-linking structure, that may be formed by heat-curing the copolymer containing the photo-alignment constitutional unit represented by the formula (1) and a thermal cross-linking constitutional unit, which are described in the "A. Thermosetting composition with photo-alignment property". The cross-linking structure is a three-dimensional network structure and a structure such that a thermal cross-linking group of a thermal cross-linking constitutional unit is cross-linked. In the case the thermosetting composition with a photo-alignment property contains a cross-linking agent, a thermal cross-linking group of a thermal cross-linking constitutional unit ordinarily bonds to the cross-linking agent. Incidentally, in the case the thermal cross-linking constitutional unit includes a self-cross-linkable cross-linking group as the thermal cross-linking group, the self-cross-linkable cross-linking group also bonds to the cross-linking agent. Also, in the case the copolymer contains the thermal cross-linking constitutional unit including a nonself-cross-linkable thermal cross-linking group and the thermal cross-linking constitutional unit including a self-cross-linkable cross-linking group as the thermal cross-linking group, the nonself-cross-linkable thermal cross-linking group bonds to the self-cross-linkable cross-linking group. Also, in the case the thermal cross-linking constitutional unit includes a self-cross-linkable cross-linking group as the thermal cross-linking group, the cross-linking group is self-cross-linked. Accordingly, the cross-linking structure is a structure such that the thermal cross-linking group and the cross-linking agent are cross-linked by heating, a structure such that the nonself-cross-linkable thermal cross-linking group and the self-cross-linkable cross-linking group are cross-linked by heating, or a structure such that the self-cross-linkable cross-linking groups are cross-linked by heating.

For example, in the case the cross-linking agent is hexamethoxymethylmelamine, the cross-linking structure is a structure described below. Incidentally, in the following formula, each sign is the same as in the formula (1).

[Chemical Formula 11]

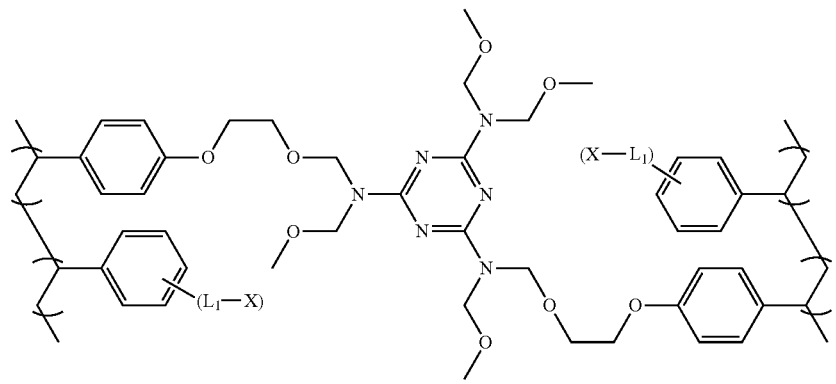

Incidentally, each constitutional unit of the copolymer is described in detail in the "A. Thermosetting composition with photo-alignment property"; therefore, the description herein is omitted.

It may be confirmed by taking and analyzing a material from the alignment layer that the alignment layer contains the copolymer. A method of NMR, IR, GC-MS, XPS, TOF-SIMS, and a combination of these may be applied to an analytical method.

Also, the alignment layer of an embodiment of the present invention comprises a photo-dimerization structure or a photo-isomerization structure of a photo-alignment group in the photo-alignment constitutional unit represented by the formula (1).

The photo-dimerization structure is a structure such that the photo-alignment groups of the photo-alignment constitutional unit represented by the formula (1) are cross-linked by a photo-dimerization reaction, and is a structure including a cyclopropane skeleton.

The photo-dimerization reaction is the reaction described below and a reaction such that an olefin structure contained in the photo-alignment group forms a cyclopropane skeleton by a photoreaction. In accordance with kinds of the photo-alignment group, Xa to Xd and Xa' to Xd' varies.

[Chemical Formula 12]

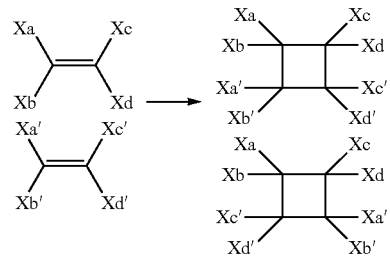

The photo-dimerization structure is preferably a photo-dimerization structure of a cinnamoyl group. Specifically, the photo-dimerization structure is preferably a structure such that the cinnamoyl groups described in the "A. Thermosetting composition with photo-alignment property" are cross-linked by a photo-dimerization reaction. Above all, the alignment layer preferably includes the photo-dimerization structure represented by the following formulae (4-1) and (4-2) Incidentally, in the following formula, each sign is the same as in the formulae (1-6) and (1-4).

[Chemical Formula 13]

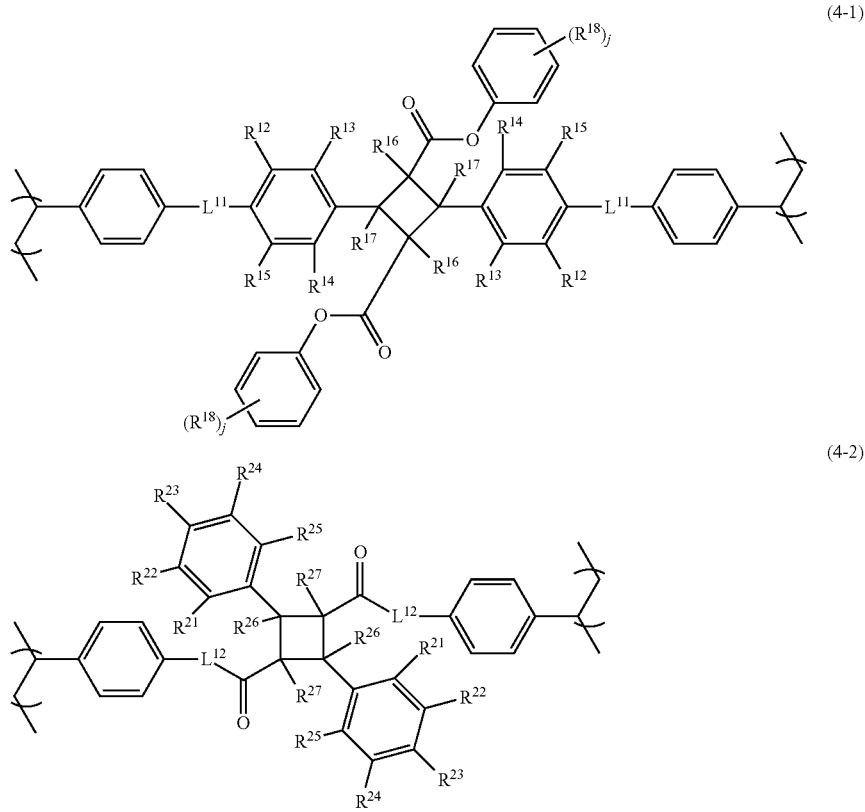

(4-1)

(4-2)

In the case the alignment layer includes the photo-dimerization structure represented by the formulae (4-1) and (4-2), many aromatic rings are disposed and many π electrons are contained. Thus, it is conceived that an affinity with a liquid crystal layer disposed on the alignment layer becomes so high as to improve liquid crystal alignment ability and adhesion properties to the liquid crystal layer.

Also, the photo-isomerization structure is a structure such that the photo-alignment group of the photo-alignment constitutional unit represented by the formula (1) is isomerized by a photo-isomerization reaction. For example, in the case of a cis-trans isomerization reaction, the photo-isomerization structure may be any of a structure such that a cis body changes to a trans body and a structure such that a trans body changes to a cis body.

For example, in the case the photo-alignment group is a cinnamoyl group, the photo-isomerization reaction is the reaction described below and a reaction such that an olefin structure contained in the photo-alignment group forms a cis body or a trans body by a photoreaction. In accordance with kinds of the photo-alignment group, Xa to Xd varies.

[Chemical Formula 14]

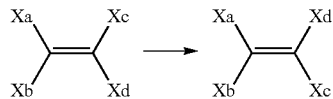

The photo-isomerization structure is preferably a photo-isomerization structure of a cinnamoyl group. Specifically, the photo-isomerization structure is preferably a structure such that the cinnamoyl group described in the "A. Thermosetting composition with photo-alignment property" is isomerized by a photo-isomerization reaction. In this case, the photo-isomerization structure may be any of a structure such that a cis body changes to a trans body and a structure such that a trans body changes to a cis body. Above all, the alignment layer preferably includes the photo-isomerization structure, which is represented by the following formula, of a cinnamoyl group represented by the formula (1-3).

[Chemical Formula 15]

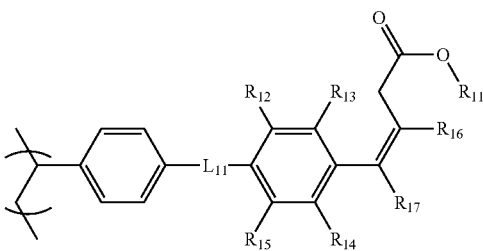

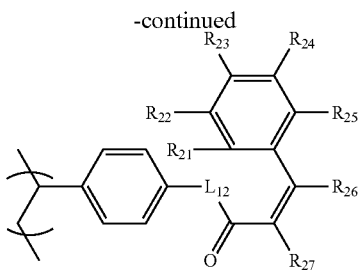

Incidentally, it may be analyzed by NMR or IR that the alignment layer includes the photo-dimerization structure or photo-isomerization structure.

Also, the alignment layer may contain a cross-linking agent, an acid or an acid generator, a sensitizer, and another addition agent. Incidentally, these addition agents are the same as those described in the "A. Thermosetting composition with photo-alignment property".

Other features such as a formation method and a film thickness of the alignment layer are the same as those of the alignment layer in the after-mentioned substrate with the alignment layer; therefore, the description herein is omitted.

C. Substrate with Alignment Layer

A substrate with an alignment layer of an embodiment of the present invention comprises a substrate, and an alignment layer formed from the thermosetting composition with a photo-alignment property or the alignment layer described above, disposed on the substrate.

FIG. 1 is a schematic sectional view showing an example of the substrate with an alignment layer of an embodiment of the present invention. In a substrate with an alignment layer 1 exemplified in FIG. 1, an alignment layer 3 is disposed on a substrate 2, and the alignment layer 3 is such as to be formed from the thermosetting composition with a photo-alignment property described above.

According to an embodiment of the present invention, the alignment layer is such as to be formed from the thermosetting composition with a photo-alignment property or the alignment layer described above, so as to allow excellent liquid crystal alignment ability, adhesion properties to a liquid crystal layer, thermal stability, and solvent resistance to be obtained.

Each constitution in the substrate with an alignment layer of an embodiment of the present invention is hereinafter described.

1. Alignment Layer

The alignment layer in an embodiment of the present invention is such as to be formed from the thermosetting composition with a photo-alignment property or the alignment layer described above, and has the function of aligning liquid crystal molecules.

Here, the alignment layer formed from the thermosetting composition with a photo-alignment property signifies an alignment layer obtained in such a manner that a film containing the thermosetting composition with a photo-alignment property is heat-cured and photo-aligned.

That is to say, in the formation of the alignment layer, first, the thermosetting composition with a photo-alignment property is applied on a substrate, dried and heated to form a cured film. Next, the cured film is irradiated with polarized ultraviolet rays to form the alignment layer.

An application method of the thermosetting composition with a photo-alignment property is not particularly limited if it is a method such as to allow a uniform film on the substrate to be formed, and examples thereof may include a spin coat method, a roll coat method, a rod bar coat method, a spray coat method, an air-knife coat method, a slot die coat method, a wire bar coat method, a flow coat method and an ink jet method.

Tools such as a hot plate and an oven may be used for drying a coating film. The temperature may be determined at approximately 30° C. to 160° C., and preferably within a range of about 50° C. to 140° C. The time may be determined at approximately 20 seconds to 60 minutes, and preferably within a range of about 30 seconds to 10 minutes.

Tools such as a hot plate and an oven may be also used for heat-curing the coating film. The temperature may be determined at approximately 30° C. to 250° C. The time may be determined at approximately 20 seconds to 60 minutes.

Also, drying and heat-curing of the coating film may be performed simultaneously or separately.

The film thickness of the cured film obtained by heat-curing the thermosetting composition with a photo-alignment property is properly selected in accordance with uses, and may be determined at approximately 0.05 μm to 30 μm. Incidentally, too thin film thickness of the cured film occasionally does not allow sufficient liquid crystal alignment ability.

The obtained cured film may be irradiated with polarized ultraviolet rays and thereby photo-dimerized or photo-isomerized to develop anisotropy. The wavelength of the polarized ultraviolet rays is ordinarily within a range of about 150 nm to 450 nm. Also, the irradiation direction of the polarized ultraviolet rays may be a vertical or an oblique direction to a substrate plane.

Incidentally, it may be confirmed by taking and analyzing a material from the alignment layer that the alignment layer is formed from the thermosetting composition with a photo-alignment property. A method of NMR, IR, GC-MS, XPS, TOF-SIMS, and a combination of these may be applied to an analytical method.

2. Substrate

A substrate used for an embodiment of the present invention supports the alignment layer.

The substrate is not particularly limited and is properly selected in accordance with uses. Examples of a material for the substrate may include glass and quartz, resins such as polyethylene terephthalate, polycarbonate, triacetylcellulose, polyester, polysulfone, polyether sulfone, cyclopolyolefin, and acryl, metals such as aluminum, and ceramics such as silicon and silicon nitride. Also, the substrate may be subjected to surface treatment.

The substrate may have flexibility or not, which is properly selected in accordance with uses.

3. Conductive Layer

In an embodiment of the present invention, a conductive layer may be formed between the substrate and the alignment layer. The conductive layer functions as an electrode of various kinds of devices, for example. Examples of a material for the conductive layer may include transparent conductive materials such as ITO and IZO, and metallic materials such as aluminum, molybdenum and chromium.

4. Uses

Examples of the uses of the substrate with an alignment layer of an embodiment of the present invention may include various optical elements such as a retardation plate, a liquid crystal display element, and a light emitting element.

D. Retardation Plate

A retardation plate of an embodiment of the present invention comprises the substrate with an alignment layer described above and a retardation layer disposed on the alignment layer of the substrate with the alignment layer.

Figure 2:
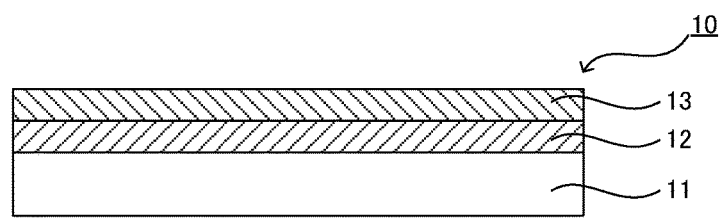
FIG. 2 is a schematic sectional view showing an example of a retardation plate in an embodiment of the present invention.

FIG. 2 is a schematic sectional view showing an example of the retardation plate in an embodiment of the present invention. In a retardation plate 10 exemplified in FIG. 2, an alignment layer 12 is disposed on a substrate 11 and a retardation layer 13 is disposed on the alignment layer 12. The alignment layer 12 is such as to be formed from the thermosetting composition with a photo-alignment property or the alignment layer described above, and the retardation layer 13 corresponds to a liquid crystal layer.

The retardation layer may be obtained in such a manner that a liquid crystal composition is applied on the alignment layer and heated up to phase transition temperature of the liquid crystal composition, and liquid crystal molecules are aligned by the alignment layer and cured.

The liquid crystal composition contains at least a liquid crystal compound and ordinarily further contains a solvent. The liquid crystal composition may further contain another component as long as the alignment of the liquid crystal compound is not hindered.

A liquid crystal composition generally used for a retardation layer may be used as the liquid crystal composition used for the retardation layer. Examples of the liquid crystal composition may include a liquid crystal composition including alignment properties such as horizontal alignment, cholesteric alignment, vertical alignment, and hybrid alignment, and the liquid crystal composition is properly selected in accordance with a combination with the alignment layer and a desired retardation.

Above all, the liquid crystal compound is preferably a polymerizable liquid crystal compound including a polymerizable group. The reason therefor is to allow the polymerizable liquid crystal compounds to be cross-linked and to increase stability of the retardation plate.

Also, the film thickness and formation method of the retardation layer may be the same as those of a general retardation layer.

The retardation plate may have flexibility or not.

E. Device

A device of an embodiment of the present invention comprises an alignment layer formed from the thermosetting composition with a photo-alignment property or the alignment layer described above.

The device is not particularly limited if it is such as to include the alignment layer, and examples thereof may include various optical elements such as a retardation plate, a liquid crystal display element, and a light emitting element.

The device is hereinafter described while divided into a retardation plate and a liquid crystal display element.

1. Retardation Plate

A retardation plate in an embodiment of the present invention comprises a substrate, an alignment layer formed from the thermosetting composition with a photo-alignment property or the alignment layer described above, disposed on the substrate, and a retardation layer disposed on the alignment layer.

Incidentally, the retardation layer is described in the "D. Retardation plate"; therefore, the description herein is omitted.

A conductive layer may be formed between the substrate and the alignment layer. Incidentally, the substrate, the alignment layer and the conductive layer are the same as the substrate, the alignment layer and the conductive layer in the "C. Substrate with alignment layer"; therefore, the description herein is omitted.

The retardation plate may have flexibility or not.

2. Liquid Crystal Display Element

A liquid crystal display element in an embodiment of the present invention has two embodiments. The liquid crystal display element is hereinafter described while divided into each of the embodiments.

(1) First Embodiment

The first embodiment of the liquid crystal display element in an embodiment of the present invention includes a first substrate with an alignment layer in which a first alignment layer is disposed on a first substrate, a second substrate with an alignment layer in which a second alignment layer is disposed on a second substrate, and a liquid crystal layer disposed between the first substrate with an alignment layer and the second substrate with an alignment layer, and the first alignment layer and the second alignment layer are such as to be formed from the thermosetting composition with a photo-alignment property, or the alignment layer described above.

Figure 3:
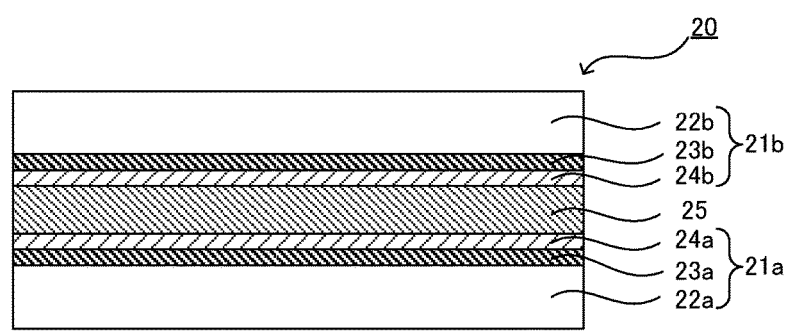
FIG. 3 is a schematic sectional view showing an example of a liquid crystal display element in an embodiment of the present invention.

FIG. 3 is a schematic sectional view showing an example of the liquid crystal display element in an embodiment of the present invention. A liquid crystal display element 20 exemplified in FIG. 3 comprises a first substrate with an alignment layer 21a, a second substrate with an alignment layer 21b, and a liquid crystal layer 25 disposed between the first substrate with an alignment layer 21a and the second substrate with an alignment layer 21b. In the first substrate with an alignment layer 21a, a first electrode 23a and a first alignment layer 24a are sequentially laminated on a first substrate 22a; in the second substrate with an alignment layer 21b, a second electrode 23b and a second alignment layer 24b are sequentially laminated on a second substrate 22b. The first alignment layer 24a and the second alignment layer 24b are such as to be formed from the thermosetting composition with a photo-alignment property or the alignment layer described above.

A liquid crystal composition generally used for a liquid crystal layer may be used as the liquid crystal composition used for the liquid crystal layer. For example, nematic liquid crystal and smectic liquid crystal may be used. Also, the film thickness and formation method of the liquid crystal layer may be the same as those of a general liquid crystal layer.

Also, a conductive layer is ordinarily formed as an electrode, at least either between the first substrate and the alignment layer or between the second substrate and the alignment layer.

Incidentally, the first substrate, the second substrate, the alignment layer, and the conductive layer are the same as the substrate, the alignment layer, and the conductive layer in the "C. Substrate with alignment layer"; therefore, the description herein is omitted.

Also, other constitutions of the liquid crystal display element may be the same as the constitutions of a general liquid crystal display element.

(2) Second Embodiment

The second embodiment of the liquid crystal display element in an embodiment of the present invention comprises the retardation plate.

The constitutions of the liquid crystal display element may be the same as the constitutions of a general liquid crystal display element. For example, the retardation plate may be disposed outside the substrate constituting the liquid crystal display element, or the substrate constituting the liquid crystal display element may also serve as the substrate constituting the retardation plate, and the alignment layer and the retardation layer may be disposed inside the substrate.

The present disclosure is not limited to the embodiments. The embodiments are exemplification, and any is included in the technical scope of the present disclosure if it has substantially the same constitution as the technical idea described in the claim of the present disclosure and offers similar operation and effect thereto.

EXAMPLES

Embodiments of the present invention are described in further detail with reference to examples and comparative examples hereinafter.

[Synthesis Example a] Synthesis of Thermal Cross-Linkable Monomer 1

The weight of 20.0 g (118 mmol) of para-acetoxystyrene is dissolved in 80 mL of ethyl acetate in a 200-mL flask under a nitrogen atmosphere, and 9.08 g (47.1 mmol) of sodium methoxide was slowly dropped thereinto over approximately 30 minutes. After stirring for one and a half hours, the finish of the reaction was confirmed by TLC to extract by ethyl acetate, thereafter washed in 1N-hydrochloric acid, pure water, and saturated salt solution, and dried by sodium sulfate. The solvent was distilled off and dried to thereby obtain a thermal cross-linkable monomer 1.

[Synthesis Example b] Synthesis of Thermal Cross-Linkable Monomer 2

The thermal cross-linkable monomer 1 was obtained in the same manner as in Synthesis Example a. In a 200-mL flask, 14.0 g (118 mmol) of the thermal cross-linkable monomer 1 was dissolved in 100 ml of dimethylformamide under a nitrogen atmosphere and ice cooling, and 7.07 g (177 mmol) of sodium hydroxide was added thereto and stirred for 15 minutes to thereafter drop 10.5 g (130 mmol) of 2-chloroethanol taking approximately 10 minutes. After stirring for 16 hours, the finish of the reaction was confirmed by TLC to extract by ethyl acetate, thereafter washed in saturated hydrogen carbonate aqueous solution, 1N-hydrochloric acid, pure water, and saturated salt solution, and dried by sodium sulfate. The solvent was distilled off and dried to thereby obtain a thermal cross-linkable monomer 2.

[Synthesis Example c] Synthesis of Self-Cross-Linkable Thermal Cross-Linkable Monomer 3

The weight of 20.0 g (118 mmol) of para-acetoxystyrene was dissolved in 80 mL of ethyl acetate in a 200-mL flask under a nitrogen atmosphere, and 9.08 g (47.1 mmol) of sodium methoxide was slowly dropped thereinto over approximately 30 minutes. After stirring for one and a half hours and confirming the finish of the reaction by TLC, 56.0 mL (944 mmol) of 37%-formalin aqueous solution was slowly added to this solution under room temperature. In addition, this solution was stirred under a nitrogen atmosphere at 40° C. for 24 hours, and thereafter projected into 200 mL of water in a beaker. To this solution, 2.0-wt % acetic acid aqueous solution was slowly added till reaching pH 5.0 while cooled in an ice bath. A precipitate was filtered out, sufficiently washed in water, thereafter dried, and filtered by column chromatography to thereby obtain a self-cross-linkable thermal cross-linkable monomer 3.

[Synthesis Example d] Synthesis of Self-Cross-Linkable Thermal Cross-Linkable Monomer 4

The weight of 20.0 g (118 mmol) of para-acetoxystyrene is dissolved in 80 mL of ethyl acetate in a 200-mL flask under a nitrogen atmosphere, and 9.08 g (47.1 mmol) of sodium methoxide was slowly dropped thereinto over approximately 30 minutes. After stirring for one and a half hours, the finish of the reaction was confirmed by TLC to extract by ethyl acetate, thereafter washed in 1N-hydrochloric acid, pure water, and saturated salt solution, and dried by sodium sulfate. The solvent was distilled off and dried to thereby obtain a self-cross-linkable monomer derivative 1.

The weight of 12 g (100 mmol) of the self-cross-linkable monomer derivative 1, 16.1 g (110 mmol) of adipic acid and 1.2 g (9.8 mmol) of dimethylaminopyridine were dissolved in 130 ml of dichloromethane in a 500-mL flask, and 22.6 g (110 mmol) of N,N'-dicyclohexylcarbodiimide dissolved in 40 ml of dichloromethane was dropped thereinto over approximately 10 minutes. After stirring for 15 hours, the reaction solution was cooled to filter out a precipitate. The solvent was distilled off to add methanol, and a self-cross-linkable monomer derivative 2 was obtained by recrystallization thereof.

Subsequently, 13.82 g (50 mmol) of the self-cross-linkable monomer derivative 2, 5.5 g (50 mmol) of hydroquinone and 0.176 g (1.47 mmol) of dimethylaminopyridine were dissolved in 50 ml of dichloromethane in a 300-mL flask under ice cooling, and 11.3 g (55 mmol) of N,N'-dicyclohexylcarbodiimide dissolved in 10 ml of dichloromethane was dropped thereinto over approximately 10 minutes. After stirring for 15 hours, the reaction solution was cooled to filter out a precipitate. The solvent was distilled off to add methanol, and a self-cross-linkable monomer derivative 3 was obtained by recrystallization thereof.

The weight of 3.68 g (10 mmol) of the self-cross-linkable monomer derivative 3 was added to a solution comprising 20 mL of 10% by weight-potassium hydroxide aqueous solution and 20 mL of ethanol, stirred, and dissolved at room temperature. To this solution, 7.0 mL (80 mmol) of 37%-formalin aqueous solution was slowly added under room temperature. In addition, this solution was stirred under a nitrogen atmosphere at 40° C. for 24 hours, and thereafter projected into 200 mL of water in a beaker. To this solution, 2.0-wt % acetic acid aqueous solution was slowly added till reaching pH 5.0 while cooled in an ice bath. A precipitate was filtered out, sufficiently washed in water, thereafter dried, and purified by column chromatography to thereby obtain a self-cross-linkable thermal cross-linkable monomer 4.

[Synthesis Example 1] Synthesis of Photo-Alignment Monomer 1

The weight of 14.7 g (80 mmol) of 4-bromostyrene, 0.18 g (800 μmol) of palladium chloride, 0.98 g (3.2 mmol) of tris(2-tolyl)phosphine and 32.4 g (320 mmol) of triethylamine were dissolved in 135 mL of dimethylacetamide in a 300-mL flask. Next, this solution was added to 8.3 g (97 mmol) of methyl acrylate mixed solution by a syringe and stirred. This mixed solution was further heated and stirred at 120° C. for 3 hours. After confirming the finish of the reaction by TLC, the reaction solution was cooled to room temperature. After filtering out a precipitate, filtrate was poured into 300 mL of 1N-hydrochloric acid aqueous solution to recover the precipitate. These precipitates were recrystallized by a 1:1 (mass ratio) solution of ethyl acetate and hexane to thereby obtain a photo-alignment monomer 1.

[Synthesis Example 2] Synthesis of Photo-Alignment Monomer 2

A photo-alignment monomer 2 was obtained by replacing methyl acrylate in Synthesis Example 1 with the equal mol amount of phenyl acrylate, and by reacting in the same manner as in Synthesis Example 1.

[Synthesis Example 3] Synthesis of Photo-Alignment Monomer 3

The weight of 20.15 g (136 mmol) of 4-vinyl benzoate, 21.0 g (118 mmol) of trans-4-methyl hydroxycinnamate, and 0.458 g (3.82 mmol) of dimethylaminopyridine were dissolved in 130 ml of dichloromethane in a 300-mL flask under ice cooling, and 28.0 g (136 mmol) of N,N'-dicyclohexylcarbodiimide dissolved in 40 ml of dichloromethane was dropped thereinto over approximately 10 minutes. After stirring for 15 hours, the reaction solution was cooled to filter out a precipitate. The solvent was distilled off to add methanol, and a photo-alignment monomer 3 was obtained.

[Synthesis Example 4] Synthesis of Photo-Alignment Monomer 4

The weight of 15.4 g (50 mmol) of the photo-alignment monomer 3 was dissolved in 200 mL of methanol in a 500-mL flask under a nitrogen atmosphere, and 8.3 g (60 mmol) of potassium carbonate was added thereto, and stirred through the night. The finish of the reaction was confirmed by TLC, and a precipitate was filtered and thereafter concentrated. The concentrate was extracted by ethyl acetate, thereafter washed in 1N-hydrochloric acid, pure water, and saturated salt solution, and dried by sodium sulfate. The solvent was distilled off and dried to thereby obtain a styrene derivative 1.

Subsequently, a photo-alignment monomer 4 was obtained by replacing 4-vinyl benzoate in Synthesis Example 3 with the equal mol amount of the styrene derivative 1, replacing trans-4-methyl hydroxycinnamate in Synthesis Example 3 with the equal mol amount of 4-cyanophenol, and by condensing in the same manner as in Synthesis Example 3.

[Synthesis Example 5] Synthesis of Photo-Alignment Monomer 5

The thermal cross-linkable monomer 1 was obtained in the same manner as in Synthesis Example a. In a 500-mL flask, 12 g (100 mmol) of the thermal cross-linkable monomer 1, 11.0 g (110 mmol) of succinic anhydride, and 1.2 g (9.8 mmol) of 4-dimethylaminopyridine were added to sufficiently dry the system. To this system, 11.2 g (110 mmol) of triethylamine and 200 mL of tetrahydrofuran were added, and reacted under reflux for 5 hours. After finishing the reaction, dilute hydrochloric acid was added, and an organic layer obtained by extracting with ethyl acetate was washed in water, dried by magnesium sulfate, thereafter concentrated and recrystallized by ethanol to thereby obtain a styrene derivative 2.

Subsequently, a photo-alignment monomer 5 was obtained by replacing 4-vinyl benzoate in Synthesis Example 3 with the equal mol amount of the styrene derivative 2, and by condensing in the same manner as in Synthesis Example 3.

[Synthesis Example 6] Synthesis of Photo-Alignment Monomer 6

A styrene derivative 3 was obtained by replacing the photo-alignment monomer 3 in Synthesis Example 4 with the equal mol amount of the photo-alignment monomer 5, and by deprotecting in the same manner as in Synthesis Example 4.

Subsequently, a photo-alignment monomer 6 was obtained by replacing 4-vinyl benzoate in Synthesis Example 3 with the equal mol amount of the styrene derivative 3, replacing trans-4-methyl hydroxycinnamate in Synthesis Example 3 with the equal mol amount of 4-methoxyphenol, and by condensing in the same manner as in Synthesis Example 3.

[Synthesis Example 7] Synthesis of Photo-Alignment Monomer 7

A styrene derivative 4 was obtained by replacing 4-vinyl benzoate in Synthesis Example 3 with the equal mol amount of the thermal cross-linkable monomer 1, replacing trans-4-methyl hydroxycinnamate in Synthesis Example 3 with the equal mol amount of adipic acid, and by condensing in the same manner as in Synthesis Example 3.

Subsequently, a photo-alignment monomer 7 was obtained by replacing 4-vinyl benzoate in Synthesis Example 3 with the equal mol amount of the styrene derivative 4, and by condensing in the same manner as in Synthesis Example 3.

[Synthesis Example 8] Synthesis of Photo-Alignment Monomer 8

A photo-alignment monomer 8 was obtained by replacing 4-vinyl benzoate in Synthesis Example 3 with the equal mol amount of the styrene derivative 2, replacing trans-4-methyl hydroxycinnamate in Synthesis Example 3 with the equal mol amount of methyl ferulate, and by condensing in the same manner as in Synthesis Example 3.

[Synthesis Example 9] Synthesis of Photo-Alignment Monomer 9

A photo-alignment monomer 9 was obtained by replacing 4-vinyl benzoate in Synthesis Example 3 with the equal mol amount of the thermal cross-linkable monomer 1, replacing trans-4-methyl hydroxycinnamate in Synthesis Example 3 with the equal mol amount of trans-cinnamic acid, and by condensing in the same manner as in Synthesis Example 3.

[Synthesis Example 10] Synthesis of Photo-Alignment Monomer 10

A photo-alignment monomer 10 was obtained by replacing 4-vinyl benzoate in Synthesis Example 3 with the equal mol amount of the thermal cross-linkable monomer 1, replacing trans-4-methyl hydroxycinnamate in Synthesis Example 3 with the equal mol amount of 4-methoxycinnamic acid, and by condensing in the same manner as in Synthesis Example 3.

[Synthesis Example 11] Synthesis of Photo-Alignment Monomer 11

A styrene derivative 5 was obtained by replacing trans-4-methyl hydroxycinnamate in Synthesis Example 3 with the equal mol amount of ethylene glycol, and by condensing in the same manner as in Synthesis Example 3.

Subsequently, a photo-alignment monomer 11 was obtained by replacing 4-vinyl benzoate in Synthesis Example 3 with the equal mol amount of the styrene derivative 5, replacing trans-4-methyl hydroxycinnamate in Synthesis Example 3 with the equal mol amount of trans-cinnamic acid, and by condensing in the same manner as in Synthesis Example 3.

[Synthesis Example 12] Synthesis of Photo-Alignment Monomer 12

A styrene derivative 6 was obtained by replacing trans-4-methyl hydroxycinnamate in Synthesis Example 3 with the equal mol amount of 1,4-butanediol, and by condensing in the same manner as in Synthesis Example 3.

Subsequently, a photo-alignment monomer 12 was obtained by replacing 4-vinyl benzoate in Synthesis Example 3 with the equal mol amount of the styrene derivative 6, replacing trans-4-methyl hydroxycinnamate in Synthesis Example 3 with the equal mol amount of trans-cinnamic acid, and by condensing in the same manner as in Synthesis Example 3.

[Synthesis Example 13] Synthesis of Photo-Alignment Monomer 13

A photo-alignment monomer 13 was obtained by replacing 4-vinyl benzoate in Synthesis Example 3 with the equal mol amount of the thermal cross-linkable monomer 2, replacing trans-4-methyl hydroxycinnamate in Synthesis Example 3 with the equal mol amount of trans-cinnamic acid, and by condensing in the same manner as in Synthesis Example 3.

[Synthesis Example 14] Synthesis of Photo-Alignment Monomer 14

The weight of 14.8 g (100 mmol) of trans-cinnamic acid and 20.2 g (200 mmol) of triethylamine were dissolved in 200 ml of dichloromethane in a 300-mL flask and stirred in an ice bath for 15 minutes. To this system, 16.7 g (110 mmol) of 4-(chloromethyl) styrene was slowly added and stirred for 18 hours. After finishing the reaction, dilute hydrochloric acid was added, and an organic layer obtained by extracting with ethyl acetate was washed in water, dried by magnesium sulfate, thereafter concentrated and recrystallized by ethanol to thereby obtain a photo-alignment monomer 14.

[Synthesis Example 15] Synthesis of Photo-Alignment Monomer 15

The weight of 14.6 g (100 mmol) of 4-acetylstyrene and 10.6 g (100 mmol) of benzaldehyde were added to 100 mL of dimethylformamide in a 300-mL flask and stirred to add 12.4 g (110 mmol) of potassium-tert-butoxide. The solution was reacted at approximately 110° C. for approximately 4 hours and cooled, and thereafter 100 mL of water and 20.0 g of acetic acid were sequentially added and further ice-cooled to filter a precipitated crystal. The obtained crystal was recrystallized by methanol to thereby obtain a photo-alignment monomer 15.

[Synthesis Example 16] Synthesis of Photo-Alignment Monomer 16

A photo-alignment monomer 16 was obtained by replacing trans-4-methyl hydroxycinnamate in Synthesis Example 3 with the equal mol amount of 7-hydroxycoumarin, and by condensing in the same manner as in Synthesis Example 3.

[Reference Synthesis Example 1] Synthesis of Reference Photo-Alignment Monomer 2

A styrene derivative 7 was obtained by replacing 4-vinyl benzoate in Synthesis Example 3 with the equal mol amount of the thermal cross-linkable monomer 1, replacing trans-4-methyl hydroxycinnamate in Synthesis Example 3 with the equal mol amount of suberic acid, and by condensing in the same manner as in Synthesis Example 3.

Subsequently, a reference photo-alignment monomer 2 was obtained by replacing 4-vinyl benzoate in Synthesis Example 3 with the equal mol amount of the styrene derivative 7, and by condensing in the same manner as in Synthesis Example 3.

[Reference Synthesis Example 2] Synthesis of Reference Photo-Alignment Monomer 3

A styrene derivative 8 was obtained by replacing trans-4-methyl hydroxycinnamate in Synthesis Example 3 with the equal mol amount of 1, 6-hexandiol, and by condensing in the same manner as in Synthesis Example 3.

Subsequently, a reference photo-alignment monomer 3 was obtained by replacing 4-vinyl benzoate in Synthesis Example 3 with the equal mol amount of the styrene derivative 8, replacing trans-4-methyl hydroxycinnamate in Synthesis Example 3 with the equal mol amount of trans-cinnamic acid, and by condensing in the same manner as in Synthesis Example 3.

The constitution of each monomer is shown in the following Tables 1 to 3.

A chemical constitution of each synthesized monomer was confirmed by $^1$H NMR measurement with the use of JEOL JNM-LA400WB manufactured by JEOL Ltd.

TABLE 1

Thermal cross-linking monomer

| hydroxy ethyl methacrylate | hydroxy ethyl acrylate | diethylene glycol mono methacrylate | hydroxy ethyl acrylamide | 2-hydroxy ethyl maleimide | 4-vynil benzoate | 1 | 2 |
|---|---|---|---|---|---|---|---|

TABLE 2

Self-cross-linkable thermal cross-linkinkable monomer

| glycidyl methacrylate | 4-hydroxy butyl acrylate glycidyl ether | N-methoxy methyl acrylamide | N-butoxy methyl acrylamide | 3 | 4 |
|---|---|---|---|---|---|

| Photo-alignment monomer | |
|---|---|
| 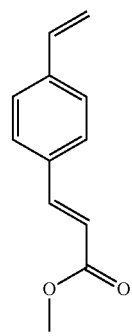 | 1 |
| 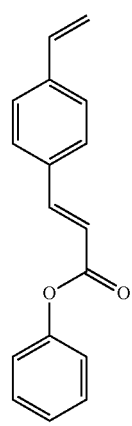 [SMILES: C=Cc1ccc(/C=C/C(=O)Oc2ccccc2)cc1] | 2 |
| 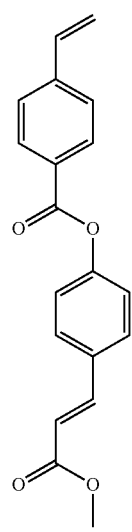 [SMILES: C=Cc1ccc(C(=O)Oc2ccc(/C=C/C(=O)OC)cc2)cc1] | 3 |
-continued
| Photo-alignment monomer | |
|---|---|
| 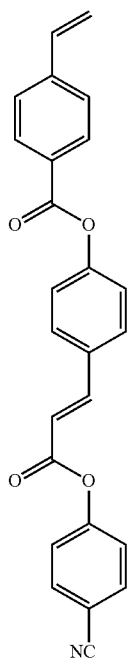 [SMILES: C=Cc1ccc(C(=O)Oc2ccc(/C=C/C(=O)Oc3ccc(C#N)cc3)cc2)cc1] | 4 |
| 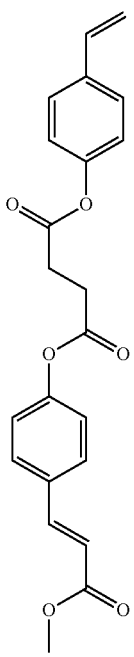 | 5 |

| Photo-alignmnet monomer | | Photo-alignmnet monomer | |
|---|---|---|---|
| 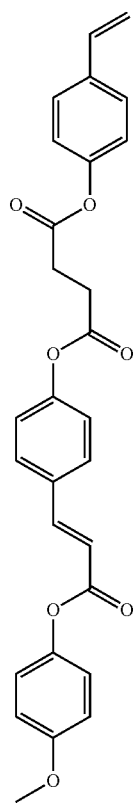 | 6 | 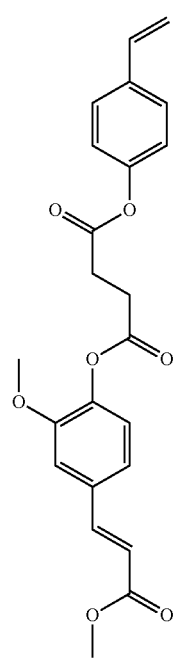 | 8 |
| 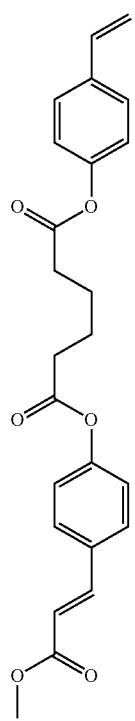 [SMILES: C=Cc1ccc(OC(=O)CCCCC(=O)Oc2ccc(/C=C/C(=O)OC)cc2)cc1] | 7 | 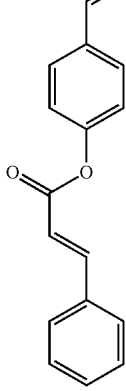 | 9 |
| | | 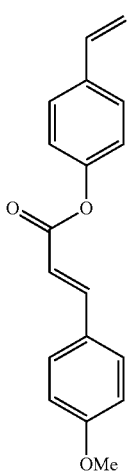 | 10 |

| Photo-alignment monomer | | Photo-alignment monomer | |
|---|---|---|---|
| 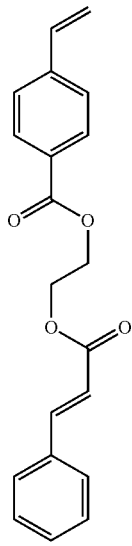 | 11 | 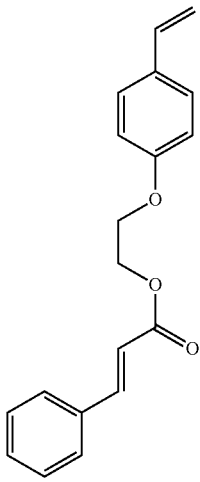 | 13 |
| 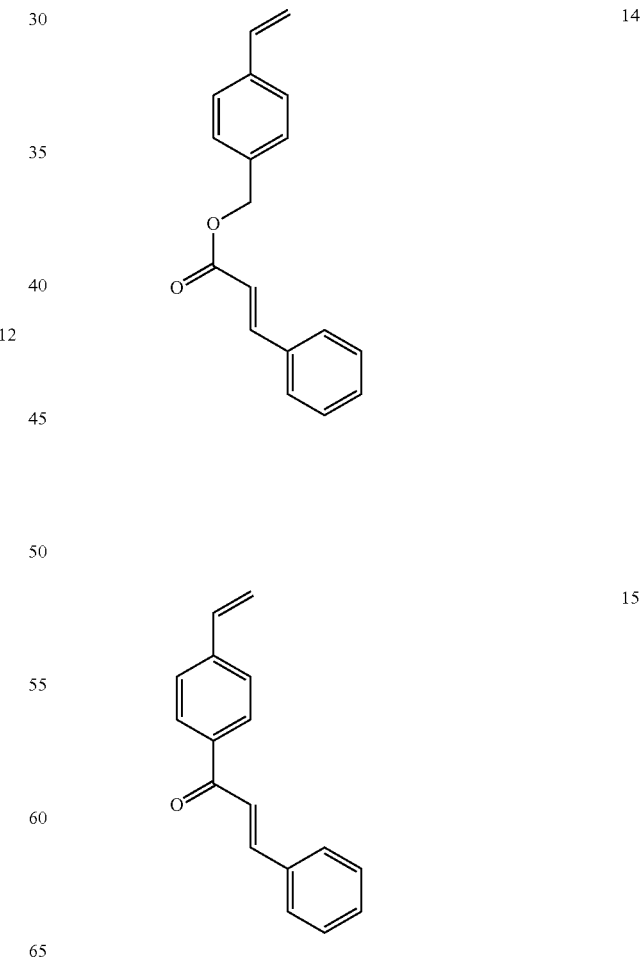 | 12 | | 14 |
| | | | 15 |

-continued
Photo-alignmnet monomer
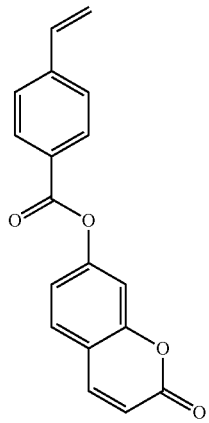 [SMILES: C=Cc1ccc(C(=O)Oc2ccc3ccc(=O)oc3c2)cc1]
16
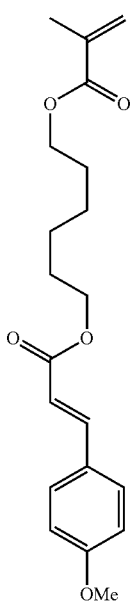
Reference 1
-continued
Photo-alignmnet monomer
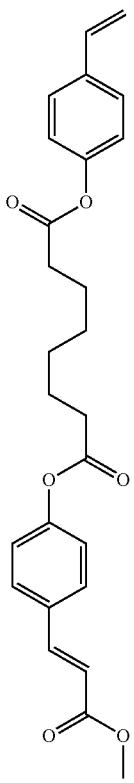
Reference 2
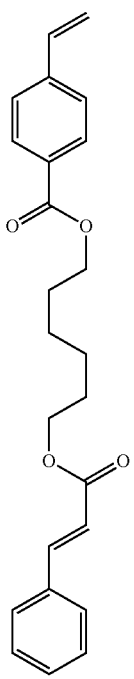
Reference 3
[Production Example 1] Synthesis of Copolymer 1
The weight of 1.30 g of hydroxyethyl methacrylate and 3.95 g of the photo-alignment monomer 4, and 50 mg of α,α'-azobisisobutyronitrile (AIBN) as a polymerization catalyst were dissolved in 25 ml of dioxane, and reacted at 90° C. for 6 hours. After the finish of the reaction, the solution was purified by a reprecipitation method to thereby obtain a copolymer 1. The number-average molecular weight of the obtained copolymer was 22600.

[Production Examples 2 to 36] Synthesis of Copolymers 2 to 36

Copolymers 2 to 36 were synthesized in the same manner as in Production Example 1 by using the thermal cross-linkable monomer shown in Table 1 and the photo-alignment monomer shown in Table 3, and another monomer as required.

[Comparative Production Examples 1 to 3] Synthesis of Comparative Copolymers 1 to 3

Comparative copolymers 1 to 3 were synthesized in the same manner as in Production Example 1 by using the thermal cross-linkable monomer shown in Table 1 and the photo-alignment monomer shown in Table 3. Incidentally, the reference photo-alignment monomer 1 is 4-(6-methacryloxyhexyl-1-oxy)methyl ester cinnamate.

[Production Examples 37 to 54] Synthesis of Copolymers 37 to 54

Copolymers 37 to 54 were synthesized in the same manner as in Production Example 1 by using the thermal cross-linkable monomer shown in Tables 1 and 2, and the photo-alignment monomer shown in Table 3.

Each of the copolymers is shown in the following Tables 4 and 5.

The number-average molecular weight (hereinafter referred to as Mn) of each synthesized copolymers was calculated by gel permeation chromatography (GPC) with the use of HLC-8220 GPC manufactured by Tosoh Corporation while regarding polystyrene as a standard reference material and NMP as an eluant.

TABLE 4

| | Thermal cross-linkable monomer | Addition amount (g) | Photo-alignment monomer | Addition amount (g) | Other monomer | Addition amount (g) | Mn |
|---|---|---|---|---|---|---|---|
| Production Example 1 | hydroxyethyl methacrylate | 1.30 | Photo-alignment monomer 4 | 3.95 | | | 22600 |
| Production Example 2 | hydroxybutyl acrylate | 1.44 | Photo-alignment monomer 4 | 3.95 | | | 24300 |
| Production Example 3 | diethylene glycol monomethachlolate | 1.74 | Photo-alignment monomer 4 | 3.95 | | | 19800 |
| Production Example 4 | hydroxyethyl acrylamide | 1.15 | Photo-alignment monomer 4 | 3.95 | | | 20500 |
| Production Example 5 | 2-hydroxyethyl maleimide | 1.41 | Photo-alignment monomer 4 | 3.95 | | | 23500 |
| Production Example 6 | 4-vinyl benzoate | 1.48 | Photo-alignment monomer 4 | 3.95 | | | 10600 |
| Production Example 7 | Thermal cross-linkable monomer 1 | 1.2 | Photo-alignment monomer 4 | 3.95 | | | 9800 |
| Production Example 8 | Thermal cross-linkable monomer 2 | 1.64 | Photo-alignment monomer 4 | 3.95 | | | 11000 |
| Production Example 9 | hydroxyethyl methacrylate | 1.3 | Photo-alignment monomer 4 | 3.95 | | | 20100 |
| Production Example 10 | hydroxyethyl methacrylate | 1.3 | Photo-alignment monomer 4 | 3.95 | | | 19600 |
| Production Example 11 | hydroxyethyl methacrylate | 1.3 | Photo-alignment monomer 4 | 3.95 | | | 52000 |
| Production Example 12 | hydroxyethyl methacrylate | 1.3 | Photo-alignment monomer 4 | 3.95 | | | 19900 |
| Production Example 13 | hydroxyethyl methacrylate | 1.3 | Photo-alignment monomer 4 | 3.95 | | | 21000 |
| Production Example 14 | hydroxyethyl methacrylate | 1.3 | Photo-alignment monomer 1 | 1.88 | | | 20600 |
| Production Example 15 | hydroxyethyl methacrylate | 1.3 | Photo-alignment monomer 2 | 2.5 | | | 22300 |
| Production Example 16 | hydroxyethyl methacrylate | 1.3 | Photo-alignment monomer 3 | 3.08 | | | 21300 |
| Production Example 17 | hydroxyethyl methacrylate | 1.3 | Photo-alignment monomer 5 | 3.8 | | | 18600 |
| Production Example 18 | hydroxyethyl methacrylate | 1.3 | Photo-alignment monomer 6 | 4.72 | | | 19600 |
| Production Example 19 | hydroxyethyl methacrylate | 1.3 | Photo-alignment monomer 7 | 5 | | | 21900 |
| Production Example 20 | hydroxyethyl methacrylate | 1.3 | Photo-alignment monomer 8 | 4.1 | | | 20000 |
| Production Example 21 | hydroxyethyl methacrylate | 1.3 | Photo-alignment monomer 9 | 2.5 | | | 17900 |
| Production Example 22 | hydroxyethyl methacrylate | 1.3 | Photo-alignment monomer 10 | 2.8 | | | 25300 |
| Production Example 23 | hydroxyethyl methacrylate | 1.3 | Photo-alignment monomer 11 | 3.22 | | | 21800 |
| Production Example 24 | hydroxyethyl methacrylate | 1.3 | Photo-alignment monomer 12 | 2.94 | | | 22600 |

TABLE 4-continued

| | Thermal cross-linkable monomer | | Photo-alignment monomer | | Other monomer | | |
|---|---|---|---|---|---|---|---|
| | | Addition amount (g) | | Addition amount (g) | | Addition amount (g) | Mn |
| Production Example 25 | hydroxyethyl methacrylate | 1.3 | Photo-alignment monomer 13 | 3.5 | | | 20900 |
| Production Example 26 | hydroxyethyl methacrylate | 1.3 | Photo-alignment monomer 14 | 2.64 | | | 21700 |
| Production Example 27 | hydroxyethyl methacrylate | 1.3 | Photo-alignment monomer 15 | 2.34 | | | 20900 |
| Production Example 28 | hydroxyethyl methacrylate | 1.3 | Photo-alignment monomer 16 | 2.92 | | | 21700 |
| Production Example 29 | hydroxybutyl acrylate | 1.44 | Photo-alignment monomer 9 | 2.5 | | | 18900 |
| Production Example 30 | diethylene glycol monomethacrylate | 1.74 | Photo-alignment monomer 9 | 2.5 | | | 19800 |
| Production Example 31 | hydroxyethyl acrylamide | 1.15 | Photo-alignment monomer 9 | 2.5 | | | 23000 |
| Production Example 32 | 2-hydroxyethyl maleimide | 1.41 | Photo-alignment monomer 9 | 2.5 | | | 20700 |
| Production Example 33 | 4-vinyl benzoate | 1.48 | Photo-alignment monomer 9 | 2.5 | | | 9800 |
| Production Example 34 | Thermal cross-linkable monomer 1 | 1.2 | Photo-alignment monomer 9 | 2.5 | | | 10600 |
| Production Example 35 | Thermal cross-linkable monomer 2 | 1.64 | Photo-alignment monomer 9 | 2.5 | methylmethacrylate | 2 | 12100 |
| Production Example 36 | hydroxyethyl methacrylate | 1.30 | Photo-alignment monomer 4 | 3.95 | styrene | 2.08 | 29800 |
| Comparative Production Example 1 | hydroxyethyl methacrylate | 1.3 | Reference Photo-alignment monomer 1 | 3.46 | | | 9200 |
| Comparative Production Example 2 | hydroxyethyl methacrylate | 1.3 | Reference Photo-alignment monomer 2 | 4.36 | | | 21500 |
| Comparative Production Example 3 | hydroxyethyl methacrylate | 1.3 | Reference Photo-alignment monomer 3 | 3.78 | | | 19800 |

TABLE 5

| | Self-cross-likable thermal cross-linkable monomer | | Thermal cross-linkable monomer | | Photo-alignment monomer | | |
|---|---|---|---|---|---|---|---|
| | Kind | Addition amount (g) | Kind | Addition amount (g) | Kind | Addition amount (g) | Mn |
| Production Example 37 | glycidyl methacrylate | 1.42 | | | Photo-alignment monomer 3 | 3.08 | 22000 |
| Production Example 38 | 4hydroxybutyl acrylate glycidyl ether | 2.00 | | | Photo-alignment monomer 3 | 3.08 | 19800 |
| Production Example 39 | N-methoxymeethyl acrylamide | 1.15 | | | Photo-alignment monomer 3 | 3.08 | 21400 |
| Production Example 40 | N-butoxymethyl acrylamide | 1.57 | | | Photo-alignment monomer 3 | 3.08 | 16700 |
| Production Example 41 | Thermal cross-linkable monomer 3 | 3.68 | | | Photo-alignment monomer 3 | 3.08 | 7200 |
| Production Example 42 | Thermal cross-linkable monomer 4 | 4.28 | | | Photo-alignment monomer 3 | 3.08 | 5100 |
| Production Example 43 | glycidyl methacrylate | 1.42 | | | Photo-alignment monomer 9 | 2.5 | 19700 |
| Production Example 44 | N-methoxymeethyl acrylamide | 1.15 | | | Photo-alignment monomer 9 | 2.5 | 20600 |
| Production Example 45 | Thermal cross-linkable monomer 3 | 3.68 | | | Photo-alignment monomer 9 | 2.5 | 6800 |
| Production Example 46 | glycidyl methacrylate | 1.42 | | | Photo-alignment monomer 11 | 3.22 | 17900 |
| Production Example 47 | N-methoxymeethyl acrylamide | 1.15 | | | Photo-alignment monomer 11 | 3.22 | 19500 |
| Production Example 48 | Thermal cross-linkable monomer 3 | 3.68 | | | Photo-alignment monomer 11 | 3.22 | 19900 |
| Production Example 49 | glycidyl methacrylate | 1.42 | hydroxyethyl methacrylate | 1.30 | Photo-alignment monomer3 | 3.08 | 20100 |

TABLE 5-continued

| | Self-cross-likable thermal cross-linkable monomer | | Thermal cross-linkable monomer | | Photo-alignment monomer | | |
|---|---|---|---|---|---|---|---|
| | Kind | Addition amount (g) | Kind | Addition amount (g) | Kind | Addition amount (g) | Mn |
| Production Example 50 | 4hydroxybutyl acrylate glycidyl ether | 2.00 | Thermal cross-linkable monomer 2 | 1.64 | Photo-alignment monomer 9 | 2.5 | 10600 |
| Production Example 51 | N-methoxymeethyl acrylamide | 1.15 | hydroxyethyl methacrylate | 1.30 | Photo-alignment monomer 11 | 3.22 | 18900 |
| Production Example 52 | N-butoxymethyl acrylamide | 1.57 | Thermal cross-linkable monomer 2 | 1.64 | Photo-alignment monomer3 | 3.08 | 9800 |
| Production Example 53 | Thermal cross-linkable monomer 3 | 3.68 | hydroxyethyl methacrylate | 1.30 | Photo-alignment monomer 9 | 2.5 | 17800 |
| Production Example 54 | Thermal cross-linkable monomer 4 | 4.28 | Thermal cross-linkable monomer 2 | 1.64 | Photo-alignment monomer 11 | 3.22 | 11200 |

Example 1

Preparation of Thermosetting Composition 1

A thermosetting composition 1 with the composition described below was prepared.
Copolymer 1: 0.1 g
hexamethoxymethylmelamine (HMM): 0.01 g
para-toluenesulfonic acid monohydrate (PTSA): 0.0015 g
propylene glycol monomethyl ether (PGME): 2.1 g
(Formation of Alignment Layer)

The thermosetting composition prepared in Example 1 was applied to one plane of a transparent glass substrate by spin coat, and heated and dried in an oven of 100° C. for 1 minute to form a cured film and obtain a coating film. This cured film surface was irradiated with polarized ultraviolet rays including emission lines of 313 nm, at 10 mJ/cm$^2$ to 30 mJ/cm$^2$ in a vertical direction to the substrate normal line, by using an Hg—Xe lamp and a Glan Taylor prism to thereby form an alignment layer.

(Production of Retardation Plate)

A photo-polymerization initiator IRGACURE™ 184 manufactured by BASF was added by 5% by mass to a solution in which the liquid crystalline monomer represented by the following formula was dissolved in cyclohexanone so as to be a solid content of 15% by mass to prepare a polymerizable liquid crystal composition.

[Chemical Formula 16]

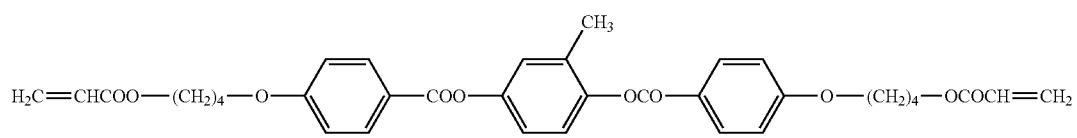

The polymerizable liquid crystal composition was applied by spin coat to a plane, on which the alignment layer of the transparent glass substrate was formed, and heated in an oven of 70° C. for 1 minute to form a coating film. In this substrate, the polymerizable liquid crystal composition applied surface was irradiated with 300 mJ/cm$^2$ of unpolarized ultraviolet rays including emission lines of 365 nm, under a nitrogen atmosphere, by using an Hg—Xe lamp, to produce a retardation plate.

Examples 2 to 38 and Comparative Examples 1 to 3

A thermosetting composition of Examples 2 to 38 and Comparative Examples 1 to 3 was prepared in the same manner as in Example 1 by using hexamethoxymethylmelamine (HMM) or 1,3,4,6-tetrakis(methoxymethyl)glycoluril (TMGU) as the cross-linking agent, para-toluenesulfonic acid monohydrate (PTSA) or para-toluenesulfonic acid pyridinium salt (PPTS) as the acid or the acid generator, and propylene glycol monomethyl ether (PGME) or methyl ethyl ketone (MEK) as the solvent to form an alignment layer and produce a retardation plate.

The composition of each thermosetting composition is shown in the following Table 6.

Example 39

Preparation of Thermosetting Composition 39

A thermosetting composition 39 with the composition described below was prepared.
Copolymer 1: 0.1 g
para-toluenesulfonic acid monohydrate (PTSA): 0.0015 g
propylene glycol monomethyl ether (PGME): 2.1 g
(Formation of Alignment Layer)

An alignment layer was formed in the same manner as in Example 1.
(Production of Retardation Plate)

A retardation plate was produced in the same manner as in Example 1.

Examples 40 to 66

A thermosetting composition of Examples 40 to 66 was prepared in the same manner as in Example 39 by using para-toluenesulfonic acid monohydrate (PTSA) or para-toluenesulfonic acid pyridinium salt (PPTS) as the acid or the acid generator, propylene glycol monomethyl ether (PGME) as the solvent, and hexamethoxymethylmelamine (HMM) or 1,3,4,6-tetrakis(methoxymethyl)glycoluril (TMGU) as the cross-linking agent to form an alignment layer and produce a retardation plate.

The composition of each thermosetting composition is shown in the following Table 7.

[Evaluations]

The following evaluations were conducted for each obtained thermosetting composition and retardation plate.

(Sensitivity and Liquid Crystal Alignment Ability)

With regard to Examples 1 to 38 and Comparative Examples 1 to 3, two sheets of linear polarizing plates were made into a crossed Nicol state to hold a retardation plate therebetween, which was visually observed. On the occasion of rotating the substrate, the evaluation was conducted while regarding the case in which a light and dark pattern observed in the plane is clear as "○", the case that a light and dark pattern observed in the plane is clear but the alignment property is weak as "Δ", and the case in which alignment defect is observed as "×". Here, the alignment property being weak signifies the case of partially grey and non-uniform.

(Adhesion Properties)

With regard to Examples 1 to 38 and Comparative Examples 1 to 3, a notch was made at an interval of 1 mm in a retardation plate with a blade cutter by using an equidistant spacer to form a grid pattern of 10×10. Subsequently, a cellophane adhesive tape was placed on the grid pattern and tightly stuck to thereafter peel off the cellophane adhesive tape. The cut portion of the coating film after peeling off the cellophane adhesive tape was observed. The case that the number of squares of the grids, in which the coating film was peeled along the line of the cut or at the crosspoint, was less than 15% with respect to the number of all squares of the grid pattern, was regarded as "A", and the case that the number of squares of the grids was 15% or more was regarded as "B".

TABLE 6

| | Copolymer | part by mass | Cross-linking agent | part by mass | Acid | part by mass | Solvent | part by mass | Evaluation Sensitivity and liquid crystal alignment property | | | Adhesion properties |
|---|---|---|---|---|---|---|---|---|---|---|---|---|
| | | | | | | | | | 10 mJ/cm$^2$ | 20 mJ/cm$^2$ | 30 mJ/cm$^2$ | |
| Example 1 | Copolymer 1 | 0.1 | HMM | 0.01 | PTSA | 0.0015 | PGMEA | 2.1 | ○ | ○ | ○ | A |
| Example 2 | Copolymer 2 | 0.1 | HMM | 0.01 | PTSA | 0.0015 | PGMEA | 2.1 | ○ | ○ | ○ | A |
| Example 3 | Copolymer 3 | 0.1 | HMM | 0.01 | PTSA | 0.0015 | PGMEA | 2.1 | ○ | ○ | ○ | A |
| Example 4 | Copolymer 3 | 0.1 | HMM | 0.03 | PTSA | 0.0015 | PGMEA | 2.1 | ○ | ○ | ○ | A |
| Example 5 | Copolymer 3 | 0.1 | HMM | 0.05 | PTSA | 0.0015 | PGMEA | 2.1 | ○ | ○ | ○ | A |
| Example 6 | Copolymer 4 | 0.1 | TMGU | 0.01 | PTSA | 0.0015 | PGMEA | 2.1 | ○ | ○ | ○ | A |
| Example 7 | Copolymer 5 | 0.1 | TMGU | 0.01 | PTSA | 0.0015 | PGMEA | 2.1 | ○ | ○ | ○ | A |
| Example 8 | Copolymer 6 | 0.1 | TMGU | 0.01 | PTSA | 0.0015 | PGME | 2.1 | ○ | ○ | ○ | A |
| Example 9 | Copolymer 7 | 0.1 | TMGU | 0.01 | PTSA | 0.0015 | PGME | 2.1 | ○ | ○ | ○ | A |
| Example 10 | Copolymer 8 | 0.1 | TMGU | 0.01 | PTSA | 0.0015 | PGME | 2.1 | ○ | ○ | ○ | A |
| Example 11 | Copolymer 9 | 0.1 | TMGU | 0.01 | PTSA | 0.0015 | PGMEA | 2.1 | ○ | ○ | ○ | A |
| Example 12 | Copolymer 10 | 0.1 | HMM | 0.01 | PTSA | 0.0015 | PGMEA | 2.1 | ○ | ○ | ○ | A |
| Example 13 | Copolymer 11 | 0.1 | HMM | 0.01 | PTSA | 0.0015 | PGMEA | 2.1 | ○ | ○ | ○ | A |
| Example 14 | Copolymer 12 | 0.1 | HMM | 0.01 | PTSA | 0.0015 | PGMEA | 2.1 | ○ | ○ | ○ | A |
| Example 15 | Copolymer 13 | 0.1 | HMM | 0.01 | PTSA | 0.0015 | PGMEA | 2.1 | ○ | ○ | ○ | A |
| Example 16 | Copolymer 14 | 0.1 | HMM | 0.01 | PPTS | 0.0015 | PGMEA | 2.1 | Δ | ○ | ○ | A |
| Example 17 | Copolymer 15 | 0.1 | HMM | 0.01 | PPTS | 0.0015 | PGMEA | 2.1 | ○ | ○ | ○ | A |
| Example 18 | Copolymer 16 | 0.1 | HMM | 0.01 | PTSA | 0.0015 | PGMEA | 2.1 | Δ | ○ | ○ | A |
| Example 19 | Copolymer 17 | 0.1 | HMM | 0.01 | PTSA | 0.0015 | PGMEA | 2.1 | Δ | ○ | ○ | A |
| Example 20 | Copolymer 18 | 0.1 | HMM | 0.01 | PTSA | 0.0015 | PGMEA | 2.1 | Δ | ○ | ○ | A |
| Example 21 | Copolymer 19 | 0.1 | HMM | 0.01 | PTSA | 0.0015 | PGMEA | 2.1 | Δ | ○ | ○ | A |
| Example 22 | Copolymer 20 | 0.1 | HMM | 0.01 | PTSA | 0.0015 | PGMEA | 2.1 | Δ | ○ | ○ | A |
| Example 23 | Copolymer 21 | 0.1 | HMM | 0.01 | PTSA | 0.0015 | PGMEA | 2.1 | ○ | ○ | ○ | A |
| Example 24 | Copolymer 22 | 0.1 | HMM | 0.01 | PTSA | 0.0015 | PGMEA | 2.1 | ○ | ○ | ○ | A |
| Example 25 | Copolymer 23 | 0.1 | HMM | 0.01 | PTSA | 0.0015 | PGMEA | 2.1 | Δ | ○ | ○ | A |
| Example 26 | Copolymer 24 | 0.1 | HMM | 0.01 | PTSA | 0.0015 | PGMEA | 2.1 | Δ | ○ | ○ | A |
| Example 27 | Copolymer 25 | 0.1 | HMM | 0.01 | PTSA | 0.0015 | PGMEA | 2.1 | Δ | ○ | ○ | A |
| Example 28 | Copolymer 26 | 0.1 | HMM | 0.01 | PTSA | 0.0015 | PGMEA | 2.1 | Δ | ○ | ○ | A |
| Example 29 | Copolymer 27 | 0.1 | HMM | 0.01 | PTSA | 0.0015 | PGMEA | 2.1 | Δ | ○ | ○ | A |
| Example 30 | Copolymer 28 | 0.1 | HMM | 0.01 | PTSA | 0.0015 | PGMEA | 2.1 | Δ | ○ | ○ | A |
| Example 31 | Copolymer 29 | 0.1 | HMM | 0.01 | PTSA | 0.0015 | PGMEA | 2.1 | ○ | ○ | ○ | A |
| Example 32 | Copolymer 30 | 0.1 | HMM | 0.01 | PTSA | 0.0015 | PGMEA | 2.1 | ○ | ○ | ○ | A |
| Example 33 | Copolymer 31 | 0.1 | HMM | 0.01 | PTSA | 0.0015 | PGMEA | 2.1 | ○ | ○ | ○ | A |
| Example 34 | Copolymer 32 | 0.1 | HMM | 0.01 | PTSA | 0.0015 | PGMEA | 2.1 | ○ | ○ | ○ | A |
| Example 35 | Copolymer 33 | 0.1 | HMM | 0.01 | PTSA | 0.0015 | PGME | 2.1 | ○ | ○ | ○ | A |
| Example 36 | Copolymer 34 | 0.1 | HMM | 0.03 | PTSA | 0.0015 | PGME | 2.1 | ○ | ○ | ○ | A |
| Example 37 | Copolymer 35 | 0.1 | HMM | 0.01 | PTSA | 0.0015 | PGME | 2.1 | ○ | ○ | ○ | A |
| Example 38 | Copolymer 36 | 0.1 | HMM | 0.01 | PTSA | 0.0015 | PGMEA | 2.1 | ○ | ○ | ○ | A |
| Comparative Example 1 | Comparative Copolymer 1 | 0.1 | HMM | 0.01 | PTSA | 0.0015 | PGMEA | 2.1 | X | X | ○ | B |
| Comparative Example 2 | Comparative Copolymer 2 | 0.1 | HMM | 0.01 | PTSA | 0.0015 | PGMEA | 2.1 | X | X | Δ | B |
| Comparative Example 3 | Comparative Copolymer 3 | 0.1 | HMM | 0.01 | PTSA | 0.0015 | PGMEA | 2.1 | X | X | Δ | B |

The thermosetting composition of Examples 1 to 38 offered favorable liquid crystal alignment ability at small light exposure and high sensitivity.

Also, any of the cases of forming an alignment layer by using the thermosetting composition of Examples 1 to 38 offered not only favorable liquid crystal alignment ability but also favorable adhesion properties. The reason therefor is conceived to be that both the photo-alignment constitutional unit and the thermal cross-linking constitutional unit of the copolymer include a styrene skeleton so that an interaction of the n-electron system acts with liquid crystal molecules.

(Liquid Crystal Alignment Property)

With regard to Examples 39 to 66, two sheets of linear polarizing plates were made into a crossed Nicol state to hold a retardation plate therebetween, which was visually observed. On the occasion of rotating the substrate, the evaluation was conducted while regarding the case that a light and dark pattern observed in the plane is greatly clear as "⊙", the case that a light and dark pattern observed in the plane is clear as "○", and the case that alignment defect is observed as "×".

[Chemical Formula 1]

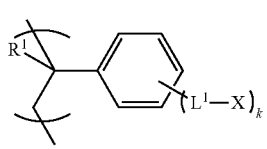

(1)

in the formula (1), X represents a photo-alignment group causing a photo-isomerization reaction or a photo-dimerization reaction, $L^1$ represents a single bond, —O—, —S—, —COO—, —COS—, —CO—, —OCO—, —OCO(CH$_2$)$_n$COO—, —OCOCH$_2$CH$_2$OCH$_2$CH$_2$COO—, —OCOC$_6$H$_4$O—, —OCOC$_6$H$_{10}$O—, —COO(CH$_2$)$_n$O—, —COOC$_6$H$_4$O—, —COOC$_6$H$_{10}$O—, —OC$_6$H$_4$O—, —OC$_6$H$_{10}$O—, or —(CH$_2$)$_n$O—, n represents 1 to 4, $R^1$ represents a hydrogen atom or a monovalent organic group, and k represents 1 to 5.

TABLE 7

| | Copolymer | | Acid | | Solvent | | Cross-linking agent | | Evaluation result Liquid crystal |
|---|---|---|---|---|---|---|---|---|---|
| | Kind | part by mass | Kind | part by mass | Kind | part by mass | Kind | part by mass | alignment property |
| Example 39 | Copolymer 37 | 0.1 | PTSA | 0.0015 | PGME | 2.1 | | | ⊙ |
| Example 40 | Copolymer 38 | 0.1 | PPTS | 0.0015 | PGME | 2.1 | | | ⊙ |
| Example 41 | Copolymer 39 | 0.1 | PTSA | 0.0015 | PGME | 2.1 | | | ⊙ |
| Example 42 | Copolymer 40 | 0.1 | PTSA | 0.0015 | PGME | 2.1 | | | ⊙ |
| Example 43 | Copolymer 41 | 0.1 | PTSA | 0.0015 | PGME | 2.1 | | | ⊙ |
| Example 44 | Copolymer 42 | 0.1 | PTSA | 0.0015 | PGME | 2.1 | | | ⊙ |
| Example 45 | Copolymer 43 | 0.1 | PTSA | 0.0015 | PGME | 2.1 | | | ⊙ |
| Example 46 | Copolymer 44 | 0.1 | PTSA | 0.0015 | PGME | 2.1 | | | ⊙ |
| Example 47 | Copolymer 45 | 0.1 | PTSA | 0.0015 | PGME | 2.1 | | | ⊙ |
| Example 48 | Copolymer 46 | 0.1 | PTSA | 0.0015 | PGME | 2.1 | | | ⊙ |
| Example 49 | Copolymer 47 | 0.1 | PTSA | 0.0015 | PGME | 2.1 | | | ⊙ |
| Example 50 | Copolymer 48 | 0.1 | PTSA | 0.0015 | PGME | 2.1 | | | ⊙ |
| Example 51 | Copolymer 49 | 0.1 | PTSA | 0.0015 | PGME | 2.1 | | | ⊙ |
| Example 52 | Copolymer 50 | 0.1 | PTSA | 0.0015 | PGME | 2.1 | | | ⊙ |
| Example 53 | Copolymer 51 | 0.1 | PTSA | 0.0015 | PGME | 2.1 | | | ⊙ |
| Example 54 | Copolymer 52 | 0.1 | PTSA | 0.0015 | PGME | 2.1 | | | ⊙ |
| Example 55 | Copolymer 53 | 0.1 | PTSA | 0.0015 | PGME | 2.1 | | | ⊙ |
| Example 56 | Copolymer 54 | 0.1 | PTSA | 0.0015 | PGME | 2.1 | | | ⊙ |
| Example 57 | Copolymer 41 | 0.1 | PTSA | 0.0015 | PGME | 2.1 | HMM | 0.01 | ○ |
| Example 58 | Copolymer 42 | 0.1 | PTSA | 0.0015 | PGME | 2.1 | TMGU | 0.01 | ○ |
| Example 59 | Copolymer 45 | 0.1 | PPTS | 0.0015 | PGME | 2.1 | HMM | 0.01 | ○ |
| Example 60 | Copolymer 48 | 0.1 | PTSA | 0.0015 | PGME | 2.1 | HMM | 0.01 | ○ |
| Example 61 | Copolymer 49 | 0.1 | PTSA | 0.0015 | PGME | 2.1 | HMM | 0.01 | ○ |
| Example 62 | Copolymer 50 | 0.1 | PTSA | 0.0015 | PGME | 2.1 | HMM | 0.01 | ○ |
| Example 63 | Copolymer 51 | 0.1 | PTSA | 0.0015 | PGME | 2.1 | HMM | 0.01 | ○ |
| Example 64 | Copolymer 52 | 0.1 | PTSA | 0.0015 | PGME | 2.1 | HMM | 0.01 | ○ |
| Example 65 | Copolymer 53 | 0.1 | PTSA | 0.0015 | PGME | 2.1 | HMM | 0.01 | ○ |
| Example 66 | Copolymer 54 | 0.1 | PTSA | 0.0015 | PGME | 2.1 | HMM | 0.01 | ○ |

The invention claimed is:

1. A thermosetting composition with a photo-alignment property, comprising a copolymer containing a photo-alignment constitutional unit represented by the following formula (1) and a thermal cross-linking constitutional unit:

2. The thermosetting composition with a photo-alignment property according to claim 1, further comprising a cross-linking agent for bonding to a thermal cross-linking group of the thermal cross-linking constitutional unit.

3. The thermosetting composition with a photo-alignment property according to claim 2, wherein the photo-alignment group is a cinnamoyl group, a chalcone group, a coumarin group, an anthracene group, a quinoline group, an azobenzene group, or a stilbene group.

4. The thermosetting composition with a photo-alignment property according to claim 1, wherein the thermal cross-linking constitutional unit comprises a self-cross-linkable cross-linking group.

5. The thermosetting composition with a photo-alignment property according to claim 1, wherein the photo-alignment group is a cinnamoyl group.

6. The thermosetting composition with a photo-alignment property according to claim 1, wherein the thermal cross-linking group of the thermal cross-linking constitutional unit is a hydroxy group.

7. An alignment layer comprising a copolymer including a photo-alignment constitutional unit represented by the following formula (1) and a cross-linking structure, and the alignment layer comprising a photo-dimerization structure or a photo-isomerization structure of a photo-alignment group in the photo-alignment constitutional unit:

[Chemical Formula 2]

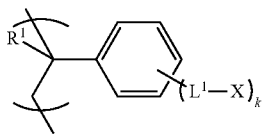

(1)

in the formula (1), X represents a photo-alignment group causing a photo-isomerization reaction or a photo-dimerization reaction, $L^1$ represents a single bond, —O—, —S—, —COO—, —COS—, —CO—, —OCO—, —OCO(CH$_2$)$_n$COO—, —OCOCH$_2$CH$_2$OCH$_2$CH$_2$COO—, —OCOC$_6$H$_4$O—, —OCOC$_6$H$_{10}$O—, —COO(CH$_2$)$_n$O—, —COOC$_6$H$_4$O—, —COOC$_6$H$_{10}$O—, —OC$_6$H$_4$O—, —OC$_6$H$_{10}$O—, or —(CH$_2$)$_n$O—, n represents 1 to 4, $R^1$ represents a hydrogen atom or a monovalent organic group, and k represents 1 to 5.

8. The alignment layer according to claim 7, wherein the cross-linking structure is a cross-linking structure obtained by bonding a thermal cross-linking group of the thermal cross-linking constitutional unit to a cross-linking agent.

9. The alignment layer according to claim 8, wherein the photo-alignment group is a cinnamoyl group, a chalcone group, a coumarin group, an anthracene group, a quinoline group, an azobenzene group, or a stilbene group.

10. The alignment layer according to claim 7, wherein the cross-linking structure is a cross-linking structure of a self-cross-linkable cross-linking group in the thermal cross-linking constitutional unit.

11. A substrate with an alignment layer comprising a substrate, and the alignment layer disposed on the substrate and formed from the thermosetting composition with a photo-alignment property according to claim 1.

12. A substrate with an alignment layer comprising a substrate, and the alignment layer according to claim 7, disposed on the substrate.

13. A retardation plate comprising a substrate, the alignment layer according to claim 7, disposed on the substrate, and a retardation layer disposed on the alignment layer.

14. A device comprising the alignment layer according to claim 7.

* * * * *